United States Patent
Nishimura

(10) Patent No.: US 8,331,241 B2
(45) Date of Patent: Dec. 11, 2012

(54) ROUTING CONTROL METHOD, COMMUNICATION APPARATUS AND COMMUNICATION SYSTEM

(75) Inventor: Kazuto Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 487 days.

(21) Appl. No.: 12/554,278

(22) Filed: Sep. 4, 2009

(65) Prior Publication Data
US 2009/0323687 A1 Dec. 31, 2009

Related U.S. Application Data

(63) Continuation of application No. PCT/JP2007/054952, filed on Mar. 13, 2007.

(51) Int. Cl.
G06F 11/00 (2006.01)
H04J 1/16 (2006.01)
H04L 1/00 (2006.01)
H04L 12/26 (2006.01)

(52) U.S. Cl. ..................... 370/241; 370/241.1
(58) Field of Classification Search .............. 370/241, 370/241.1, 242, 389, 392
See application file for complete search history.

(56) References Cited

U.S. PATENT DOCUMENTS

| | | | |
|---|---|---|---|
| 6,400,715 B1 * | 6/2002 | Beaudoin et al. | 370/392 |
| 7,719,987 B2 | 5/2010 | Kobayashi et al. | |
| 2005/0286537 A1 * | 12/2005 | Shimada | 370/395.53 |
| 2006/0126517 A1 * | 6/2006 | Kurosaki et al. | 370/241 |
| 2006/0293061 A1 | 12/2006 | Kobayashi et al. | |
| 2008/0095047 A1 * | 4/2008 | Skalecki et al. | 370/225 |
| 2011/0305245 A1 * | 12/2011 | Tanaka et al. | 370/401 |

FOREIGN PATENT DOCUMENTS

| | | |
|---|---|---|
| JP | 03-162035 | 7/1991 |
| JP | 06-37764 | 2/1994 |
| JP | 2003-157198 | 5/2003 |
| JP | 2005-136589 | 5/2005 |
| JP | 2005-167881 | 6/2005 |
| JP | 2005-303998 | 10/2005 |

OTHER PUBLICATIONS

Japanese Office Action dated Aug. 16, 2011, from corresponding Japanese Application No. 2009-503814.
International Search Report with partial translation dated Apr. 17, 2007 for corresponding International Application PCT/JP2007/054952.

* cited by examiner

Primary Examiner — Chuong T Ho
(74) Attorney, Agent, or Firm — Katten Muchin Rosenman LLP

(57) ABSTRACT

A routing control method includes learning a route of receiving a first packet, which first packet has identification information attached thereto, only for the first packet having first arrived among a plurality of first packets that have identification information common to that of the first packet, which route is applied for transmitting a second packet having the same identification information as that of the first packet; and transmitting the first packet, wherein transmitting the first packet is done in a controlled manner depending on a condition of the first packet, wherein the controlled manner of transmitting the first packet includes controlling timing of the transmitting the first packet.

20 Claims, 21 Drawing Sheets

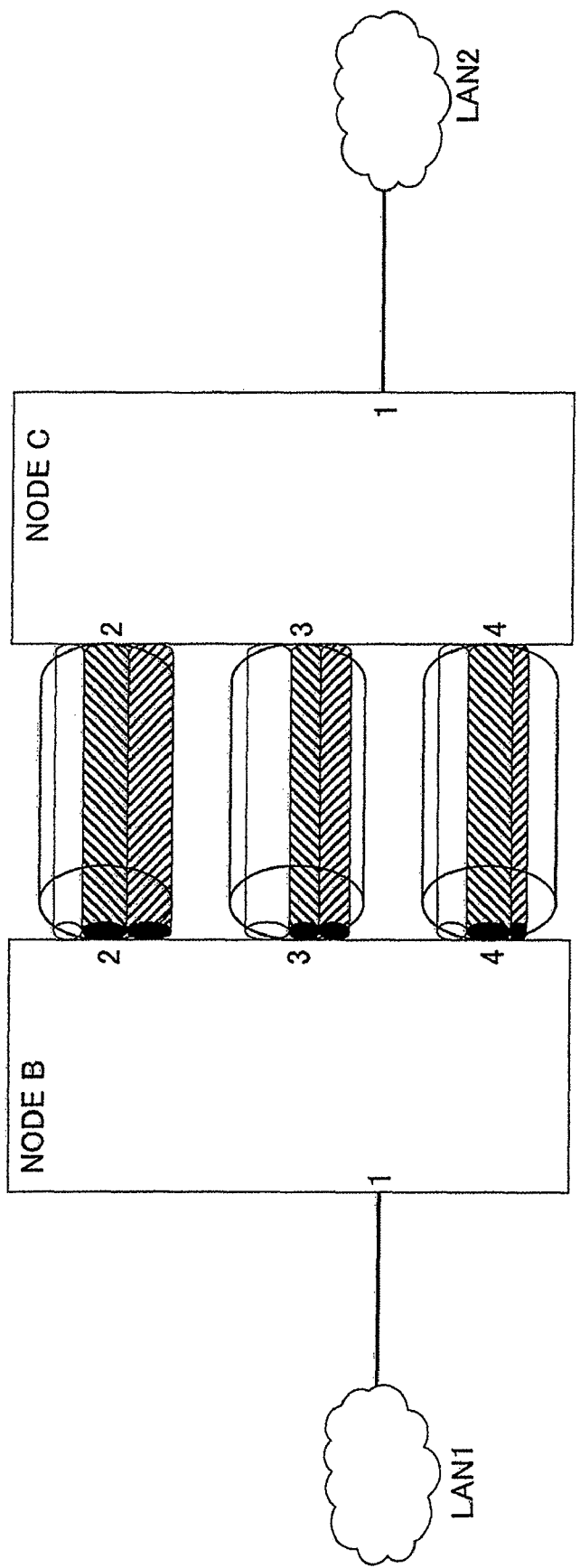

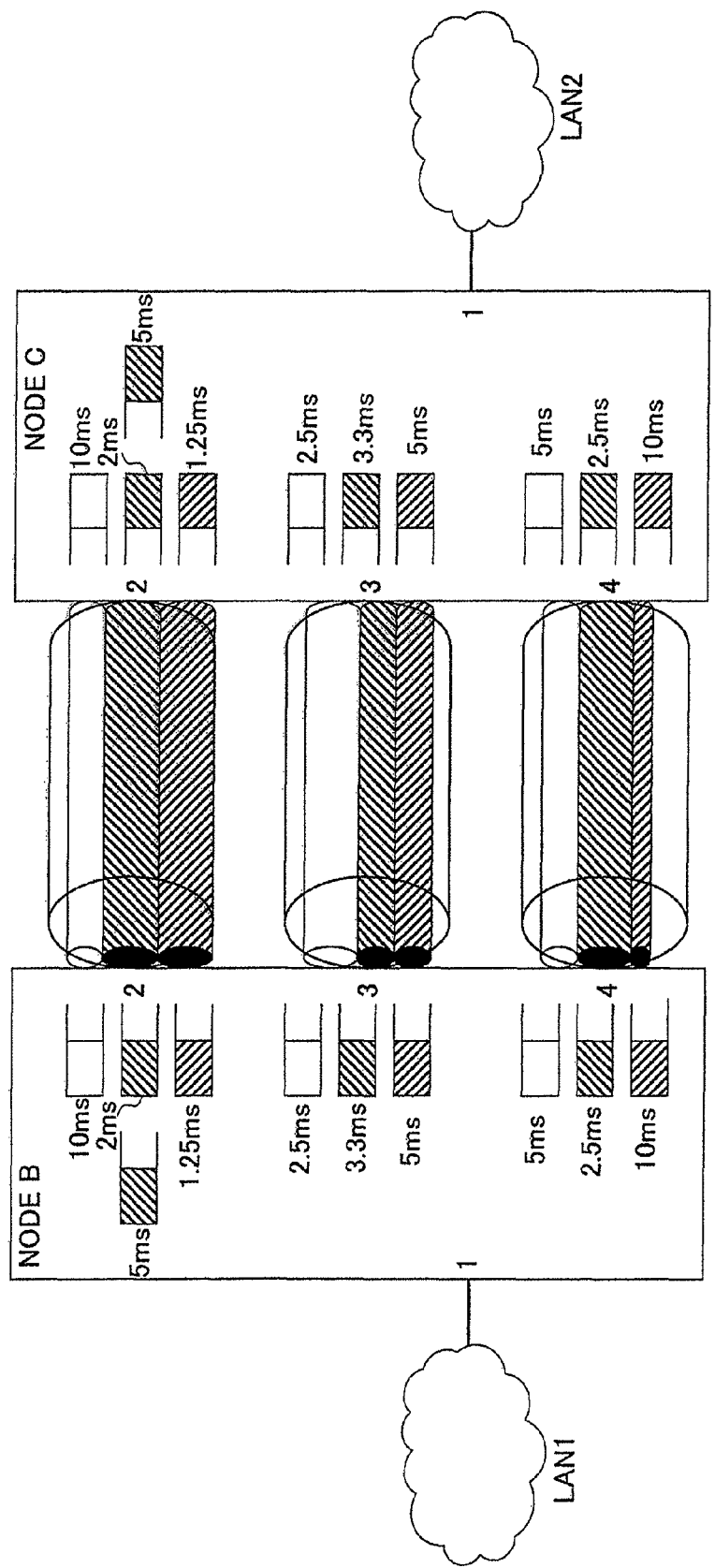

ROUTING CONTROL METHOD, COMMUNICATION APPARATUS AND COMMUNICATION SYSTEM

CROSS-REFERENCE TO RELATED APPLICATIONS

This application is a U.S. continuation application filed under 35 USC 111(a) claiming benefit under 35 USC 120 and 365(c) of PCT application JP2007/054952, filed Mar. 13, 2007. The foregoing application is hereby incorporated herein by reference.

FIELD

The embodiment discussed herein is directed to a routing control method, a communication apparatus and a communication system.

BACKGROUND

An inter-network mutual connecting system is known. In the inter-network mutual connecting system, nodes are included in a network in which a connection port of a communication apparatus is recognized from a message which the communication apparatus sends, and routing is controlled. A node of the network includes storing means for storing transmission destination address information, transmission source address information, reception input and output port information and final access time information of a message which passes through the node, accessing means for accessing the storing means and transmission/reception control means for controlling transmission/reception of the message. In the above-mentioned inter-network mutual connecting system, when the node receives a message having common transmission destination address information and transmission source address information within a certain time interval, the node discards the message received later.

Japanese Laid-Open Patent Applications Nos. 3-162035, 6-37764 and 2003-157198 disclose related arts.

SUMMARY

In the embodiment, a routing control method includes learning a route of receiving a first packet for identification information, which first packet has been transmitted with the identification information attached thereto, only for the first packet having first arrived among a plurality of first packets that have identification information common to that of the first packet, which route is applied for transmitting a second packet having the same identification information as that of the first packet; transmitting the first packet, wherein the transmitting the first packet is done in a controlled manner depending on a condition of the first packet, and wherein the controlled manner of transmitting the first packet includes controlling timing of the transmitting the first packet.

The object and advantages of the disclosure will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 17A, 17B and 17C illustrate specific operation examples of functions depicted in FIGS. 10 and 15 of the communication apparatus depicted in FIG. 8.

DESCRIPTION OF EMBODIMENT

Figure 1:
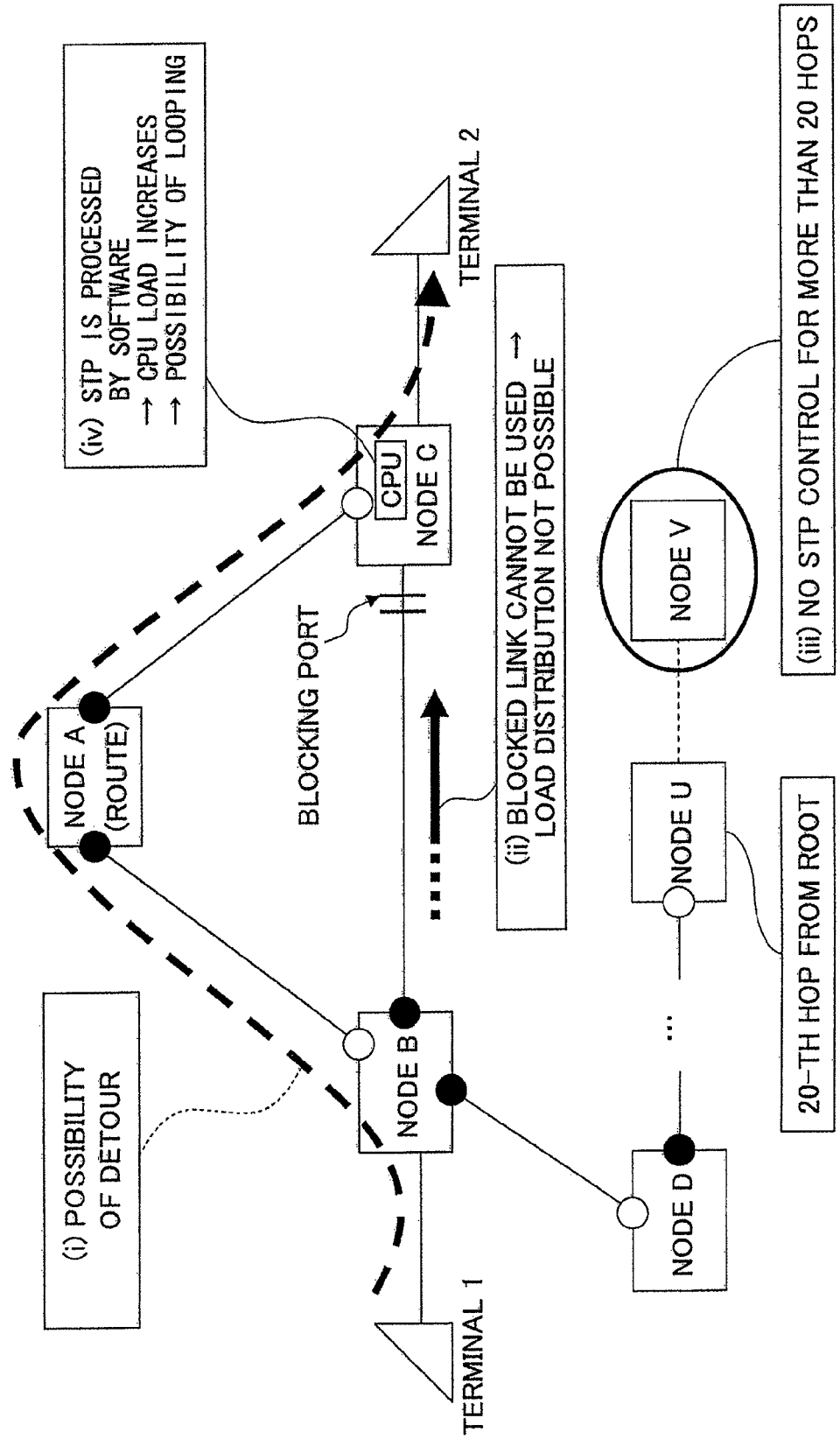
FIGS. 1 and 2 illustrate a reference example.

A first-arrival port learning method is a method for determining a route in a packet forwarding operation carried out in a packet communication network such as an Ethernet network.

In the first-arrival port learning method, a data packet for which a route is not determined (i.e., a not yet learned packet) is transmitted in a manner of "flooding" as data packets to a communication network. In each node having received the data packets, a data packet which has arrived first is used to learn a MAC address of a transmission source of the data packet. The other data packets having arrived later are discarded. Thus, a route of the first arrived data packet is learned, and is used as a route of transmitting a data packet having the transmission source address as a transmission destination address.

In the above-described first-arrival port learning method, a route for transmitting a data packet is automatically determined from information obtained from a first arrived data packet among data packets made to flood as mentioned above. However, determining a route for transmitting a data packet may be made by an artificial control operation, or in consideration of a band of a link to be used for transmitting the data packet.

More specifically, the above-mentioned first-arrival port learning method may be basically used for a packet forwarding operation, and further, a route of transmitting a data packet may be determined with an artificial control operation, or in consideration of a band of a link to be used transmitting the data packet. Thereby, it may be possible to effectively achieve load distribution.

According to the embodiment of the present invention, basically according to the above-mentioned first-arrival port learning method, further in consideration of the above-described situation, each node of a communication network controls a manner of transmitting a data packet depending on a condition of the data packet during a flooding operation. Specifically, a delay is given to the data packet, or the data packet is discarded during the flooding operation.

As a result of a manner of transmitting a data packet being controlled depending on a condition of the data packet during the flooding operation, timing at which another node receives the data packet during the flooding operation changes accordingly. Alternatively, timing of arrival of a data packet may be controlled in a node which has received the data packet.

Thus, arrival times of data packets having been made to flood and transferred through various routes are controlled. As a result, for example, it is possible to carry out control such that a first data packet having first identification information transferred through a first route does not arrive first at a node, and thereby, a second data packet having second identification information transferred through a second route arrives first. Then, according to the first-arrival port learning method, the second route will be used for transmitting a data packet having the second identification information. Thus, routing may be controlled artificially. One example of the first and second identification information are first and second MAC addresses, respectively.

In the embodiment of the present invention, it is possible to control routing artificially in a packet forwarding operation according to a first-arrival port learning method, and therefore, it is possible to achieve effective load distribution in consideration of a band of a link.

In the embodiment of the present invention, in each of nodes connected together through a packet communication network, a delay is intentionally inserted for a specific packet concerning a certain port, or the specific packet is discarded, for example. Thereby, there is a greater likelihood that the certain port will be removed from first-arrival port candidates, and artificial routing control is achieved. Further, a delay is inserted automatically depending on a transmission rate of a link, and thereby, increasing the likelihood that a route having a wider band is selected, and effective load distribution will be achieved.

For the purpose of easy understanding of the embodiment of the present invention, related art will now be described.

Recently, with spreading of wide area Ethernet service, Ethernet penetrates a MAN or a WAN field remarkably. A layer-2 switch (L2SW) is cheaper than a router, and also, any protocol may be used in a higher layer, whereby a system design is easier. Thus, Ethernet may further spread. However, L2SW is originally based on LAN technology, and use of L2SW in a WAN field is not considered. Therefore, the following problems in terms of system design may be involved in spreading Ethernet.

In the Ethernet standard, a spanning tree protocol (STP) is solely prescribed as a network redundant method. According to STP, when a loop exists physically in a network, a logical tree network may be built as a result of a corresponding port being logically blocked.

However, when STP is used, a data packet (referred to as a packet, hereinafter) may pass only through a logical tree. For example, as depicted in FIG. 1, a packet cannot pass an optimum route because a logical block (i.e., a blocking port) blocks the optimum route. Further, in this case, effective load distribution may not be achieved because a link between nodes B and C is not used.

In order to solve the problem, an extended method called MSTP (Multiple Spanning Tree Protocol) exists. In this method, a plurality of trees (STI, Spanning Tree Instances) are built in a network, and a tree used is changed among the plurality of trees for each VLAN. Thus, load distribution is achieved.

Figure 2:
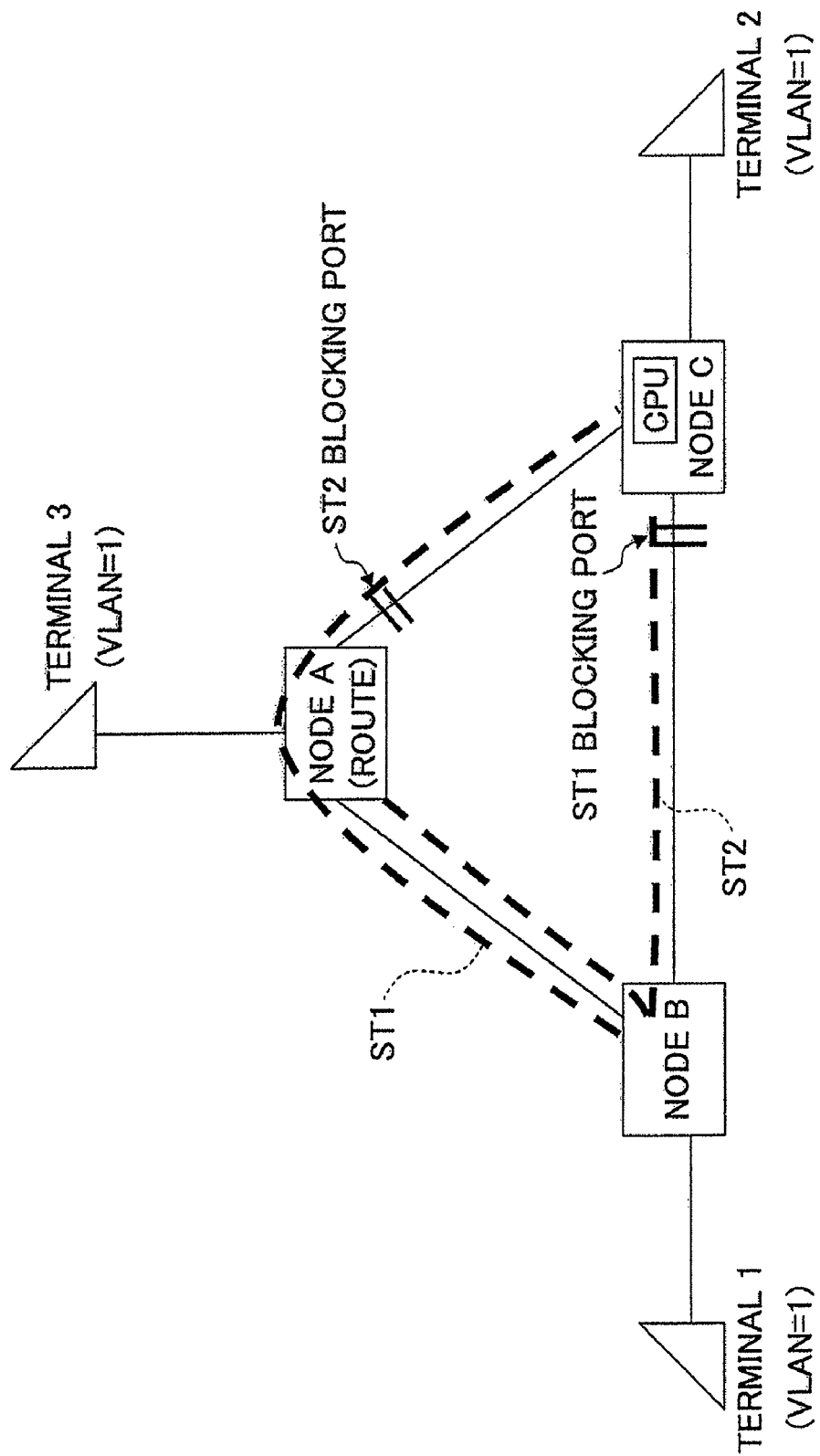

However, according to MSTP, VLAN is mapped to STI. Therefore, for example, as depicted in FIG. 2, a pattern may occur in which an optimum route cannot be used for a case where users belonging to a common VLAN=1 exist at respective ends of three nodes A, B and C. That is, when ST1 (spanning tree 1) is used, a route between a terminal 1 and a terminal 2 is a detour, while, when ST2 (spanning tree 2) is used, a route between the terminal 2 and a terminal 3 is a detour.

Further, when using STP, software processing is required for generating or interpreting BPDU (Bridge Protocol Data Unit). As a result, a load of a CPU of a node increases. Further, for a case of MSTP, information for a plurality of STI is processed, and thus, the load of the CPU further increases. Furthermore, when the CPU has a trouble, a protocol operation may not be carried out properly, and thus, a loop may be formed.

Further, in BPDU of STP, a field called a message age is provided, and BPDU having passed more than a certain number of nodes is discarded. The maximum number of hops is 20 according to STP standard. Therefore, a scalability problem may occur such that a network having a size which allows more than 20 hops cannot be built.

The above-mentioned first-arrival port learning method has been created to solve one or more of the above problems.

Figure 3:
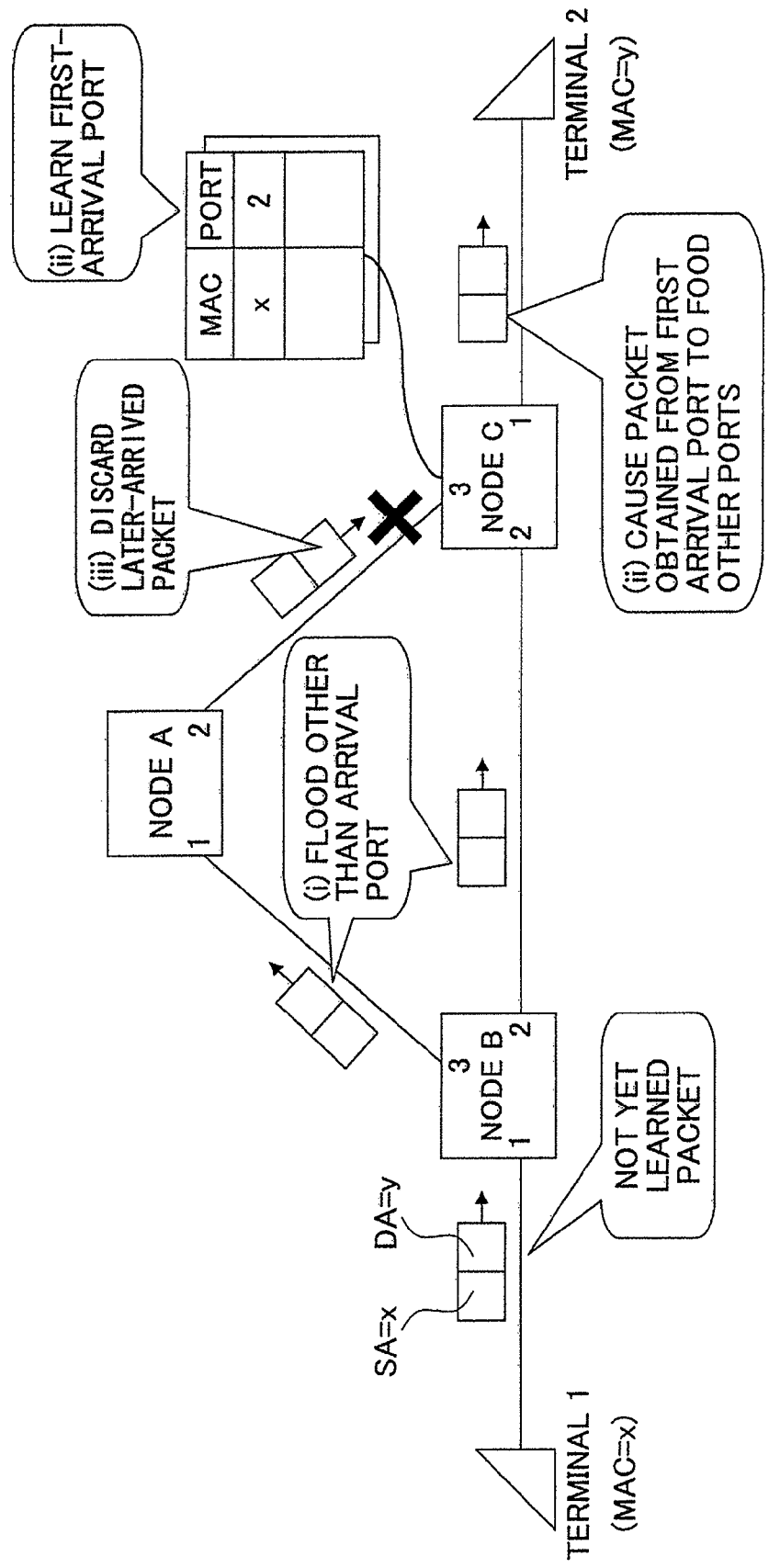
FIGS. 3, 4, 5, 6 and 7 illustrate a first-arrival port learning method.

According to the first-arrival port learning method, as depicted in FIG. 3, (i) when a packet for which a destination address (i.e., a destination identifier, for example, a MAC address) has not been learned (simply referred to as a not yet learned packet, hereinafter) arrives at a node, the node causes the not yet learned packet to flood as a plurality of flooding packets from respective ports other than a port from which the not yet learned packet arrived.

(ii) When same packets arrive at a node from respective ports, the node forwards only a first arrived packet from among the arrived same packets. Also in the node, when the first arrived packet is a not yet learned packet, the node causes the not yet learned packet to flood as a plurality of flooding packets from respective ports other than a port from which the not yet learned packet arrived. Further, the node learns the port from which the above-mentioned first arrived packet has arrived (simply referred to as a first-arrival port) together with a transmission source address of the first-arrived packet (i.e., a transmission source identifier, for example, a MAC address). Learning uses an address table (i.e., a MAC table or such, see FIG. 3).

In a case of FIG. 3, a packet having a transmission source address (SA) of x and a destination address (DA) of y is made to flood from a transmission source terminal 1 (MAC address=x), and arrive at a node C from a port 3 via a node A, and from a port 2 via a node B directly.

In this case, it is assumed that a flooding packet via the node B directly has arrived first. As depicted in FIG. 3, the node C learns the first-arrival port 2 for the transmission source address x.

Further, a flooding, not yet learned packet having the transmission source address x has arrived at the node B first from a port 1. Therefore, the node learns the port 1 for the transmission source address x. It is noted that an address table for the node B is omitted.

(iii) The other later-arrived packets are discarded.

In the example of FIG. 3, a later-arrived packet passing through the node A is discarded by the node C.

Figure 4:
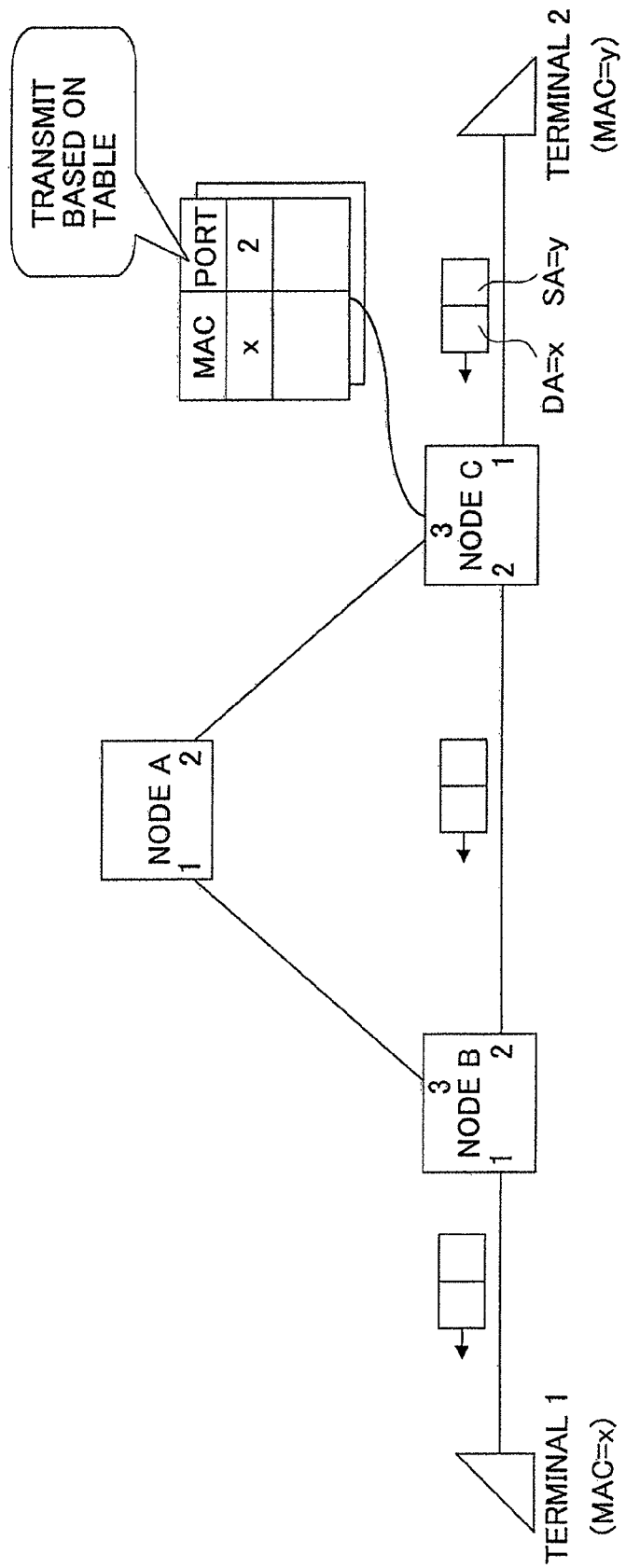

Further, thereafter, as depicted in FIG. 4, when a packet having a transmission source address y and a destination address x is sent from a terminal 2 (MAC address=y), the node C having received the packet has already learned the address x in the above-mentioned address table. Accordingly, the node C sends the packet from the port 2 which has been learned for the address x as mentioned above in the address table, in the same manner as that of a common Ethernet switch. As a result, the packet is transferred to the node B via a route connected to the port 2 of the node C.

The node B has already learned the address x in its own address table, which address x is the same as the destination address x of the currently arrived packet. Therefore, the node B sends the packet from the port 1 having been learned in its own address table as mentioned above for the address x. As a result, the packet is transferred to the terminal 1 connected to the port 1 of the node B, which terminal 1 is the destination of the packet.

Thus, according to the first-arrival port learning method, the route, through which the first-arrived packet having a transmission source address has passed, is learned (as the corresponding port) by each node. As a result, thereafter, the same route is applied for a packet having a destination address that is the same as the transmission source address of the first-arrived packet, according to the learning result.

Thus, according to the first-arrival port learning method, a port from which a packet has arrived first is treated as an optimum port, and a route is determined automatically. That is, the optimum route is selected without requiring any software processing carried out according to a protocol or such.

However there may be a case where, by carrying out an artificial routing operation, more effective load distribution may be achieved.

Figure 5:
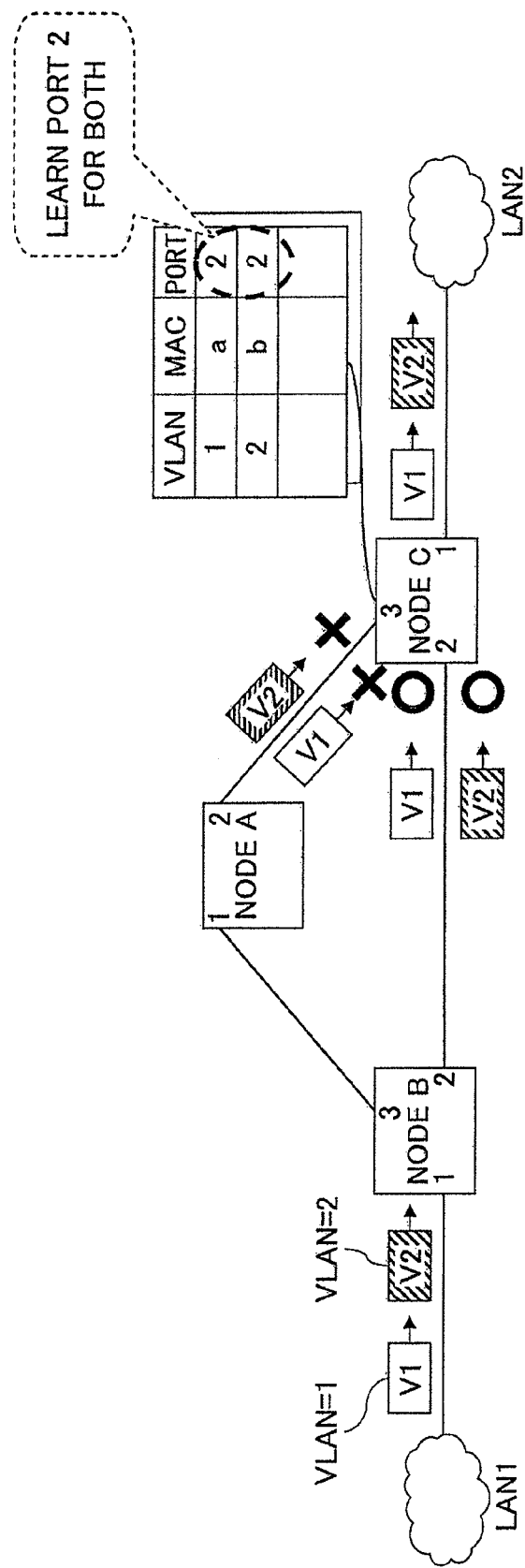
Figure 6:
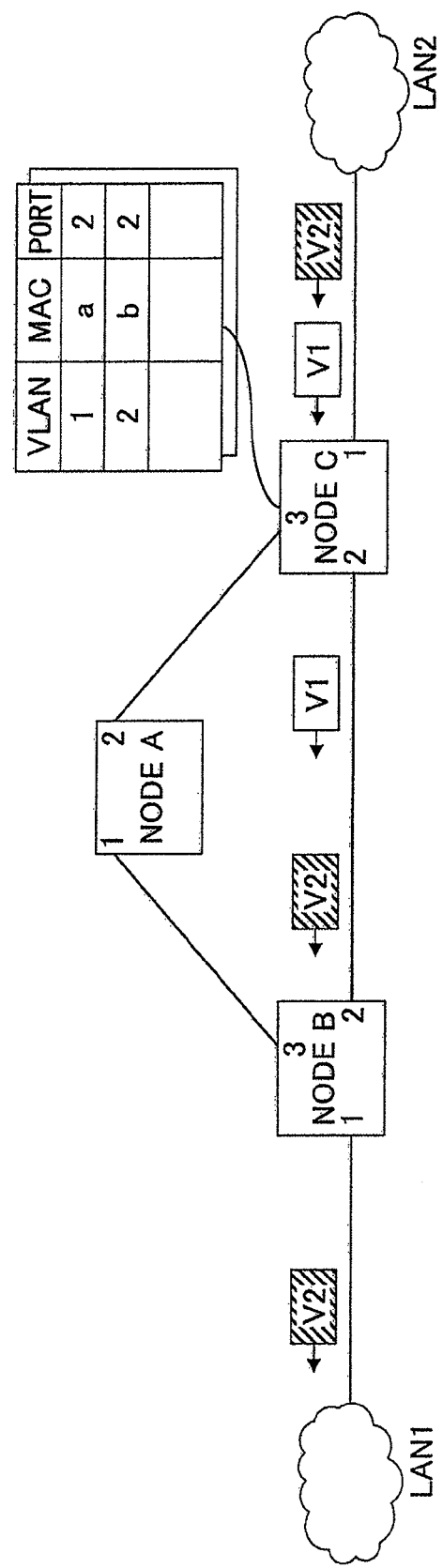

For example, as depicted in FIG. 5, in a network in which LAN 1 and LAN 2 are connected together by using three switch nodes A, B and C, two traffics, i.e., VLAN ID=1 and VLAN ID=2, flow.

In the case of FIG. 5, there is a greater likelihood that a packet made to flood for LAN 2 passing through a bottom route (i.e., a bottom link) depicted in FIG. 5 will arrive at a node C first, which route has the smaller number of hops in each of the above-mentioned two traffics since the bottom route directly reaches a node C from a node B without passing through a node A. Therefore, according to the first-arrival port learning method, there is a greater likelihood that only a port 2 will be leaned by the node C.

As a result, in an address table of the node C depicted in FIG. 5, there is a greater likelihood that only the port 2 will be learned for the two traffics. Thereby, there is a greater likelihood that a unicast traffic from LAN 2 to LAN 1 will use only the bottom route. In such a case, traffics concentrate on the bottom route which directly connects between the nodes B and C, and thus, the band may not be used effectively.

According to the first-arrival port learning method, a band of a link is particularly not considered.

Figure 7:
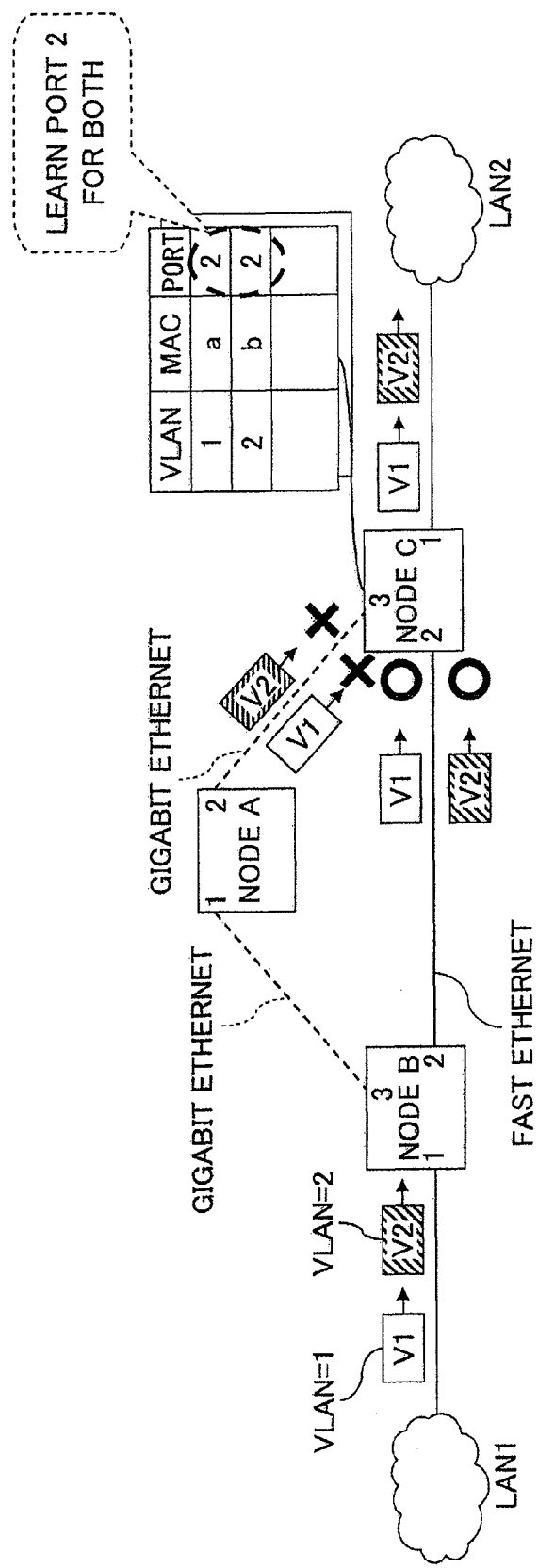

That is, a packet reading rate of Gigabit Ethernet (simply referred to as GbE, hereinafter) is ten times that of Fast Ethernet (simply referred to as FE, hereinafter). Therefore, ordinarily, a packet passing through a route including a link of GbE will arrive first. However, as depicted in FIG. 7, a case may occur in which only packets passing through a link of FE arrive first, because a node exists through a link of GbE, or, temporary congestion occurs in the link of GbE by accident. In such a case, the first-arrival port learning method selects the route including the FE link, which route is actually narrower than the route including the GbE link, traffics concentrate on the narrower route as a result, and thus, appropriate load distribution may not be achieved.

The embodiment of the present invention solves one or more of the above problems.

Intentional routing control (traffic engineering) may be carried out in the first-arrival port learning method by providing a control plane such as OSPF (Open Shortest Path First) or STP and introducing a concept of cost to a link. However, this method may contradict a basic concept of the first-arrival port learning method to omit such a control plane, and thus, may not be preferable. Route controlling which does not particularly require such a control plane is preferable.

As mentioned above, the first-arrival port learning method is a method in which, a port from which a flooding packet arrives first at a node is selected as an optimum port. Therefore, according to the first-arrival port learning method, a port from which a flooding packet arrives later is not selected as an optimum port.

Therefore, control can be made such that, for a port from which a flooding packet should originally arrive at a node first, a flooding packet is made to arrive later or is made to not arrive at the node. Thereby, it is possible to intentionally change a first-arrival port and thus, it is possible to control routing accordingly.

For example, in the above-mentioned case of FIG. 5, a delay is inserted for a flooding packet of VLAN ID=2, passing through the bottom route. Thereby, there is a greater likelihood that, a packet passing through the node A, i.e., arriving at the node C from the port 3, is caused to arrive at the node C faster than the packet passing through the bottom route, i.e., arriving at the node C from the port 2. As a result, the node C determines the route of the port 2 as optimum for the traffic of VLAN ID=1, and determines the route of the port 3 as optimum for the traffic of VLAN ID=2 as a result of the delay being inserted as mentioned above. Thereby, the traffics are distributed to the two routes of the respective ports 2 and 3 of the node C, and thus, load distribution is achieved.

Figure 8:
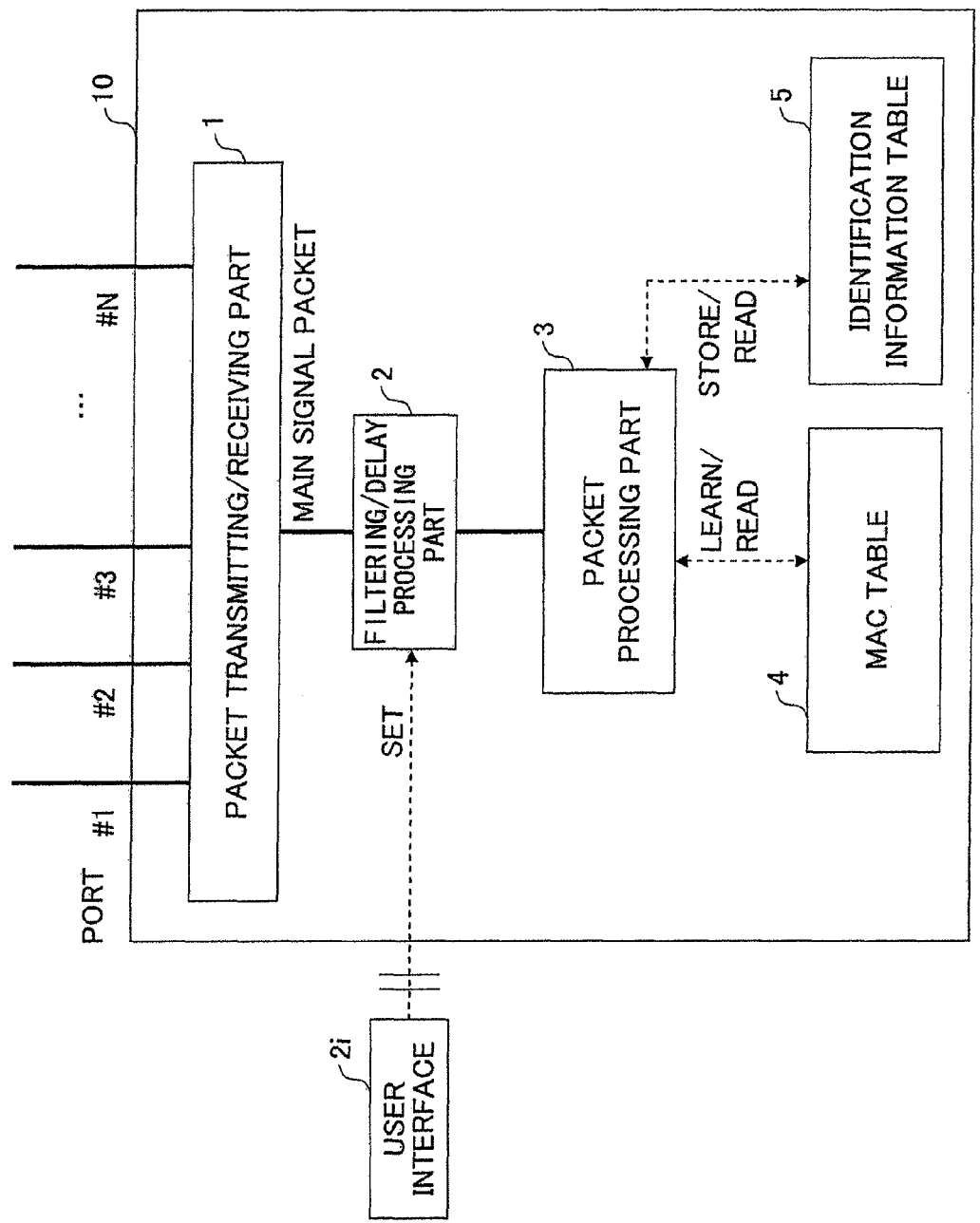
FIG. 8 depicts a function block diagram illustrating a communication apparatus to which a first embodiment is applied.

FIG. 8 depicts an example of a configuration of a communication apparatus in an embodiment of the present invention which carries out the above-described control.

The communication apparatus 10 acts as each node mentioned above.

The communication apparatus 10 has a plurality of ports #1, #2, . . . , #N, and each port is connected to a packet transmitting/receiving part 1.

The packet transmitting/receiving part 1 carries out processing concerning transmitting/receiving such as capsuling of a packet. A data packet of a main signal is sent to a packet processing part 3 via the packet transmitting/receiving part 1.

The packet processing part 3 carries out packet forwarding processing according to the first-arrival port learning method and identity determining processing.

The packet forwarding processing can be the same as that in a common Ethernet switch. That is, an address table 4 such as that mentioned above is read, and, when a record of a destination address of a currently processed packet is found from the address table 4, an instruction is sent to the packet transmitting/receiving part 1 to send the packet from a port of the found record. On the other hand, when a corresponding record is not found from the address table 4, an instruction is sent to the packet transmitting/receiving part 1 to cause the packet to flood.

The identity determining processing is processing to determine whether a currently received packet is the same as an already received packet. That is, the identity determining processing is processing to determine whether a currently processed packet is a first-arrived packet or a later-arrived packet.

Specifically, when a packet arrives, the packet processing part 3 accesses an identification information table 5, and determine whether information concerning the packet exists in the identification information table 5. When information corresponding to the packet does not exist in the identification information table 5, the packet processing part 3 determines the packet as a first-arrived packet, and writes a port, from which the packet has arrived, in the address table 4 as a first-arrival port. In this case, the packet processing part 3 further writes information used for determining identity of the packet (for example, degenerate information by using a Hash function) in the identification information table 5.

On the other hand, when information corresponding to the currently arrived packet exists in the identification information table 5, the packet processing part 3 determines the packet as a later-arrived packet and discards the packet.

The above-described operation is an operation according to the first-arrival port learning method.

In the embodiment of the present invention, a filtering/delay processing part 2 is provided between the packet transmitting/receiving part 1 and the packet processing part 3.

The filtering/delay processing part 2 carries out filtering processing or inserts a delay for a packet when the packet is transmitted or received. The filtering/delay processing part 2 has a user interface 2i, from which a user can set a parameter to the filtering/delay processing part 2. That is, according to a value of the parameter thus set by the user, filtering processing or insertion of a delay is carried out by the filtering/delay processing part 2.

Below, with reference to FIGS. 9, 10, 11A, 11B, 12, 13, 14 and 15, examples of functions of the filtering/delay processing part 2 will be described.

The filtering/delay processing part 2 can have one or more of total five functions described below with reference to FIGS. 9, 10, 12, 13, 14 and 15. When the filtering/delay processing part 2 has a plurality of functions of the above-mentioned five functions, a user can select any one of the plurality of functions from the user interface 2i.

Figure 9:
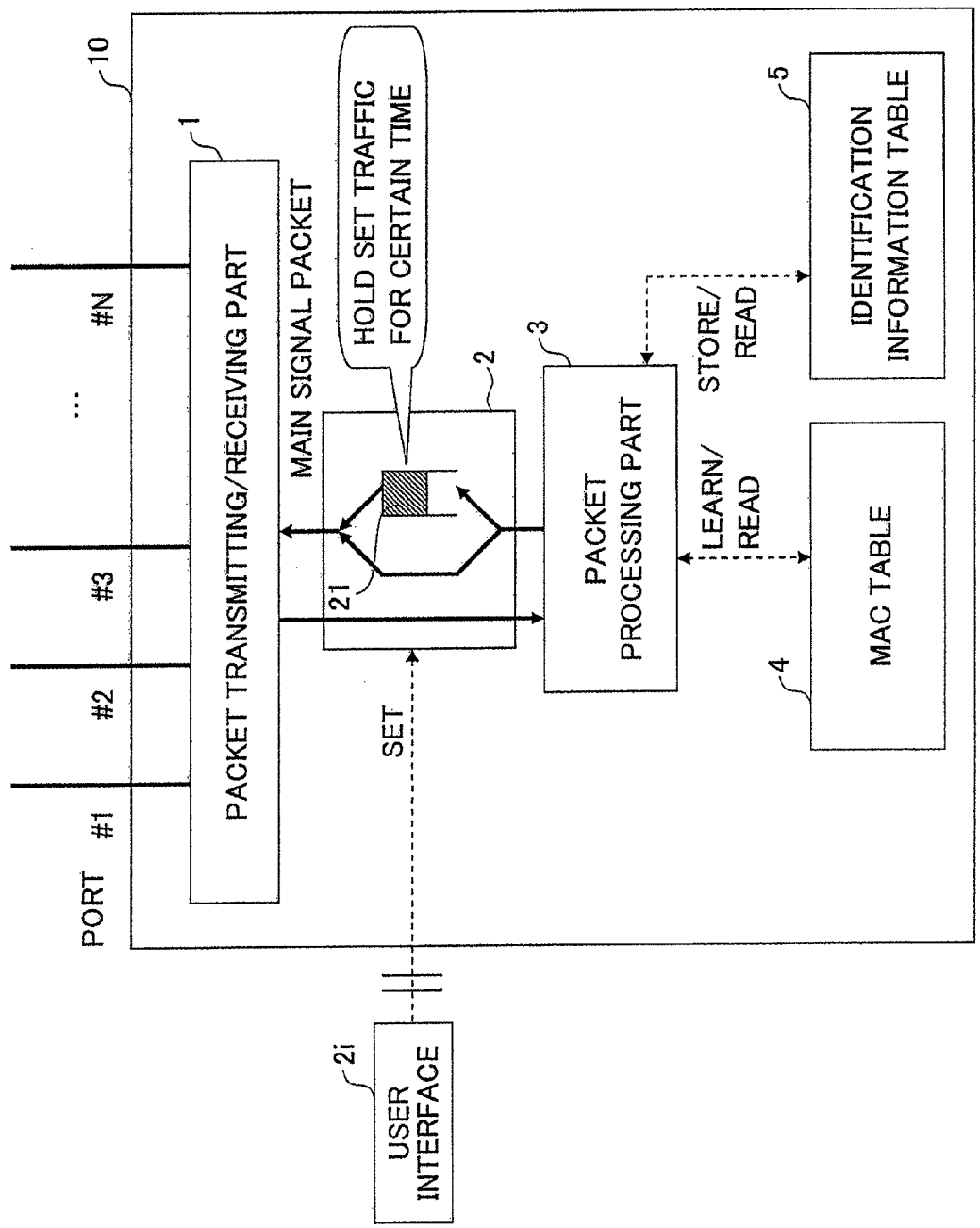
FIGS. 9 and 10 illustrate examples of a function of the filtering/delay processing part depicted in FIG. 8.

FIG. 9 illustrates an example of a function of the filtering/delay processing part 2 to insert a delay to a packet sent to the packet transmitting/receiving part 1 from the packet processing part 3, i.e., a packet to be sent out from the communication apparatus 10.

In the function of the filtering/delay processing part 2, a delay is inserted to a packet to be sent out from the communication apparatus 10 from a specific port, and thereby, timing at which the packet will arrive at an opposite communication apparatus connected to the specific port of the communication apparatus 10 is delayed.

As a result, in the opposite communication apparatus, the likelihood that a port receiving the packet becomes a first-arrival port is effectively reduced. Thereby, the likelihood that a route between the opposite ports is selected to be used for a unicast traffic is effectively reduced. Thus, artificial routing control is achieved.

In this case, a traffic to which a delay is thus inserted is set by a user from the user interface 2i. As setting information, for example, "entire port", "port+VLAN", "port+QoS class" or such, can be set.

When "entire port" is set, a predetermined delay is always inserted to a packet which is sent out from the communication apparatus 10 from a designated port. When "port+VLAN" is set, a predetermined delay is inserted to a packet which is sent out from the communication apparatus 10 from a designated port in a case where the packet belongs to a designated VLAN. When "port+QoS class" is set, a predetermined delay is inserted to a packet which is sent out from the communication apparatus 10 from a designated port in a case where the packet belongs to a designated QoS class.

For example, when "port+VLAN" or "port+QoS class" is set, there is a greater likelihood that the port of the opposite communication apparatus connected to the designated port of the communication apparatus 10 will not become a first-arrival port for a designated traffic (designated VLAN or designated QoS).

For example, a case is assumed where ports #1 and #2 (see FIG. 9) are connected to the opposite communication apparatus, and a setting is made such that a delay is inserted to the port #1 for VLAN #1, and a delay is inserted to the port #2 for VLAN #2.

In such a case, in communication between the communication apparatus 10 and the opposite communication apparatus, for a traffic of VLAN #1, there is a greater likelihood that a port of the opposite communication apparatus connected to the port #2 to which no delay is inserted for VLAN #1 will be selected. In the same way, for a traffic of VLAN #2, there is a greater likelihood that a port of the opposite communication apparatus connected to the port #1 to which no delay is inserted for VLAN #2 will be selected.

By the above-described function of the filtering/delay processing part 2, it is possible to effectively distribute traffic loads of the respective routes.

It is noted that, in the example of the function described above of the filtering/delay processing part 2, the filtering/delay processing part 2 carries out no processing on a packet which is sent to the packet processing part 3 from the packet transmitting/receiving part 1.

Figure 10:
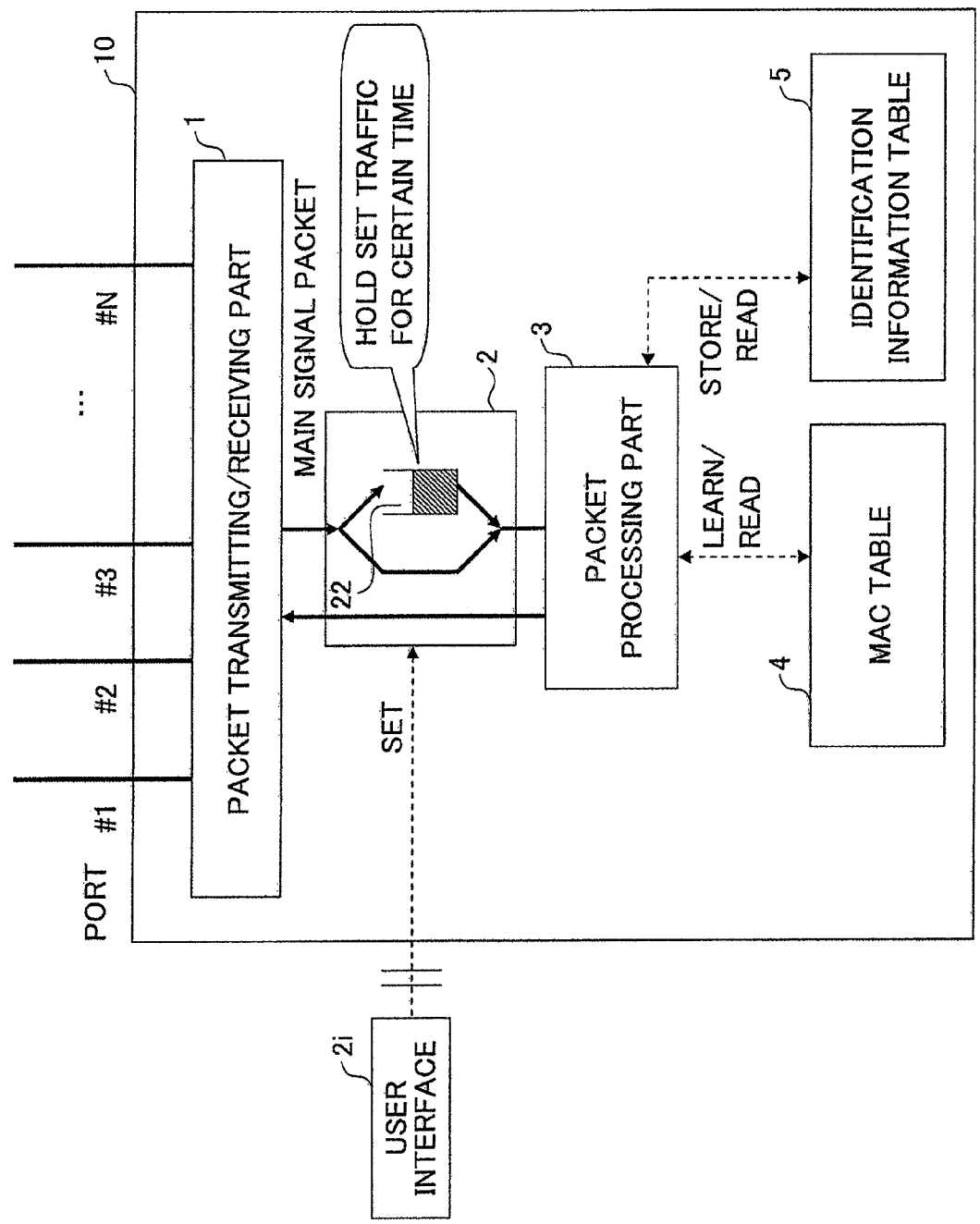

FIG. 10 illustrates another example of a function of the filtering/delay processing part 2 in which a delay is inserted to a packet which is sent to the packet processing part 3 from the packet transmitting/receiving part 1. That is, in the example of the function of the filtering/delay processing part 2 of FIG. 10, a delay is inserted to a packet which the communication apparatus 10 has received.

In the example of FIG. 10, the filtering/delay processing part 2 inserts a delay to a packet having been received from the outside from a specific port of the communication apparatus 10. As a result, the packet processing part 3 receives the packet at timing which is delayed accordingly.

The packet processing part 3 determines timing of packet arrival among respective ports based on timing of packet receiving according to the first-arrival port learning method. As a result of the delay being inserted as mentioned above, packet receiving timing delays accordingly. Thereby, the likelihood that the specific port is determined as a first-arrival port is reduced accordingly. Thus, it is possible to effectively reduce the likelihood that a route connected to the specific port is selected as a route for a unicast traffic. Thus, artificial routing control is achieved.

A packet to which a delay is inserted is set by a user from the user interface 2i. Also in this case, as setting information, the same as the case of FIG. 9, for example, "entire port", "port+VLAN", "port+QoS class" or such, can be set. In such case, there is a greater likelihood that a designated port will not become a first-arrival port for a designated traffic (designated VLAN or designated QoS).

For example, the same as the above example, a case is assumed where ports #1 and #2 are connected with an opposite communication apparatus, and a setting is made such that a delay is inserted to the port #1 for VLAN #1, and a delay is inserted to the port #2 for VLAN #2.

In this case, in communication between the communication apparatus 10 and the opposite communication apparatus, the likelihood that the port #2, to which no delay is inserted for VLAN #1, is selected for a traffic of VLAN #1 increases, and similarly, the likelihood that the port #1, to which no delay is inserted for VLAN #2, is selected for a traffic of VLAN #2 increases. As a result, for unicast traffics from the communication apparatus 10, there is a greater likelihood that the port #2 will be selected as an optimum route for a traffic of VLAN #1, and that there is a greater likelihood that the port #1 will be selected as an optimum route for a traffic of VLAN #2.

Thereby, it is possible to effectively distribute loads of the respective routes.

It is noted that, in the example of FIG. 10, no processing is carried out on a packet sent from the packet processing part 3 to the packet transmitting/receiving part 1.

Next, with reference to FIGS. 11A and 11B, an example of a configuration of a delay inserting part 200 as a specific configuration which gives a delay to a packet by the filtering/delay processing part 2 described above with reference to FIGS. 9 and 10, will be described.

It is noted that a configuration of the delay inserting part 200 described below is merely an example of the filtering/delay processing part 2, and a specific configuration of the delay inserting part 200 as the filtering/delay processing part 2 of the communication apparatus 10 in the embodiment of the present invention is not limited thereto.

Figure 11:
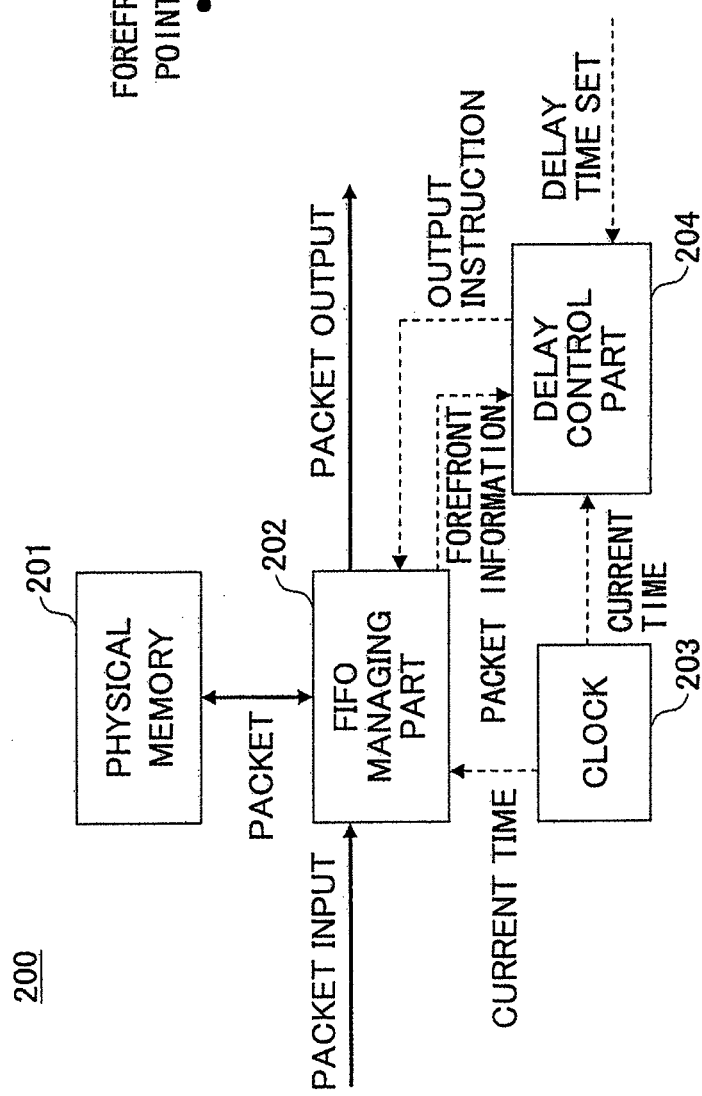
FIGS. 11A and 11B illustrate a function of a delay inserting part applicable as a function of the filtering/delay processing part depicted in FIG. 8, and as being used for realizing functions depicted in FIGS. 8, 10, 14 and 15.

FIG. 11A depicts a block configuration of the delay inserting part 200.

The delay inserting part 200 has a configuration of a FIFO (First-In First-Out) buffer together with a part which manages time.

Specifically, the packet inserting part 200 includes a physical memory 201 storing a packet, a FIFO managing part 202 which manages information of the packet, a clock 203 which manages time and a delay control part 204 which determines whether a time for which the packet has been stored exceeds a predetermined delay time.

The FIFO managing part 202 has a FIFO information table depicted in FIG. 11B.

In an item "address" of the FIFO information table, an address of the physical memory 201 at which a packet is stored is written. In an item "written time", a time at which the packet is stored in the physical memory 201 is written. Further, a forefront pointer is provided which points to a forefront of the FIFO. The above-mentioned time may not be a standard time (hour/minute/second) but can be an inside apparatus time which the clock 203, which is provided inside of the communication apparatus 10, generates.

An operation of the delay inserting part 200 will now be described.

First of all, a predetermined delay time given to a packet as mentioned above is set in the delay control part 204. The setting can be carried out by an operator from the user interface 2i (in the example of FIG. 9 or FIG. 10), or can be automatically set by software (in an example of a function of FIG. 14 or FIG. 15 described later).

Next, an operation carried out when a packet is input in the delay inserting part 200 will now be described. When a packet is input to the delay inserting part 200, the FIFO managing part 202 stores the packet in the physical memory 201. The FIFO managing part 202 writes an address at which the packet has been stored and a current time obtained from the clock 203, to the FIFO information table of FIG. 11B at the forefront of a vacant part of the FIFO information table.

Next, an operation of outputting a packet from the delay inserting part 200 will be described. The delay control part 204 obtains a time at which a packet at the forefront of the FIFO information table was stored from the FIFO managing part 202, and compares the obtained time with a current time obtained from the clock 203. Then, when a difference between the stored time of the forefront packet and the current time exceeds the above-mentioned set delay time, the delay control part 204 provides an instruction to the FIFO managing part 201 to output the forefront packet.

When receiving the instruction, the FIFO managing part 201 takes the packet registered at the forefront of the FIFO information table from the physical memory 201, and outputs from the delay control part 200. After that, an entry corresponding to the thus-output packet is deleted from the FIFO information table, and the forefront pointer is shifted to the next entry.

The above-mentioned FIFO information table of the delay inserting part 200 as the filtering/delay processing part 2 can be provided for each of ports of the communication apparatus 10, and the delay control part 204 can carry out setting of a delay time and comparison between the set delay time and a storing time for each of the FIFO information tables, in sequence, on a table-by-table basis. Thereby, it is possible to set a delay time to insert for each port separately. In this case, for a port for which no delay is to be inserted, storing a packet to the physical memory 201 may be omitted.

By applying the delay inserting part 200 configured as described above as the filtering/delay processing part 2, it is possible to set a time from when a packet is input to the filtering/delay processing part 2 to when the packet is output from the filtering/delay processing part 2, as a predetermined delay time. Thus, it is possible to provide the predetermined delay time to a packet having received (in the example of FIG. 10) or to provide the predetermined delay time to a packet which will be sent out (in the example of FIG. 9).

Further, in the case where the above-mentioned "port+VLAN" or "port+QoS class" is set, for a packet other than a packet concerning a designated VLAN or belonging to a designated QoS, storing in the physical memory 201 may be omitted.

Further, in a case where, for a single port, a different delay time can be set for each VLAN or each QoS class (an example of FIG. 15, described later), a delay time for a packet stored in the physical memory 201 can be managed for each VLAN or for each QoS class. In order to realize such a configuration, for example, the FIFO information table of FIG. 11B can be provided for each VLAN or for each QoS class, and the delay control part 204 can set a delay time and compare between a packet storing time and the set delay time, for each FIFO information table, in sequence, on a table-by-table basis. Further, in a case where, an upper limit band is set finely for the same VLAN (in an example of FIGS. 17A, 17B and 17C), similarly, the FIFO information table of FIG. 11B can be provided for each of set upper limit bands for each VLAN, and the delay control part 204 can set a delay time and compare between a packet storing time and the set delay time, for each FIFO information table, in sequence, on a table-by-table basis.

Figure 12:
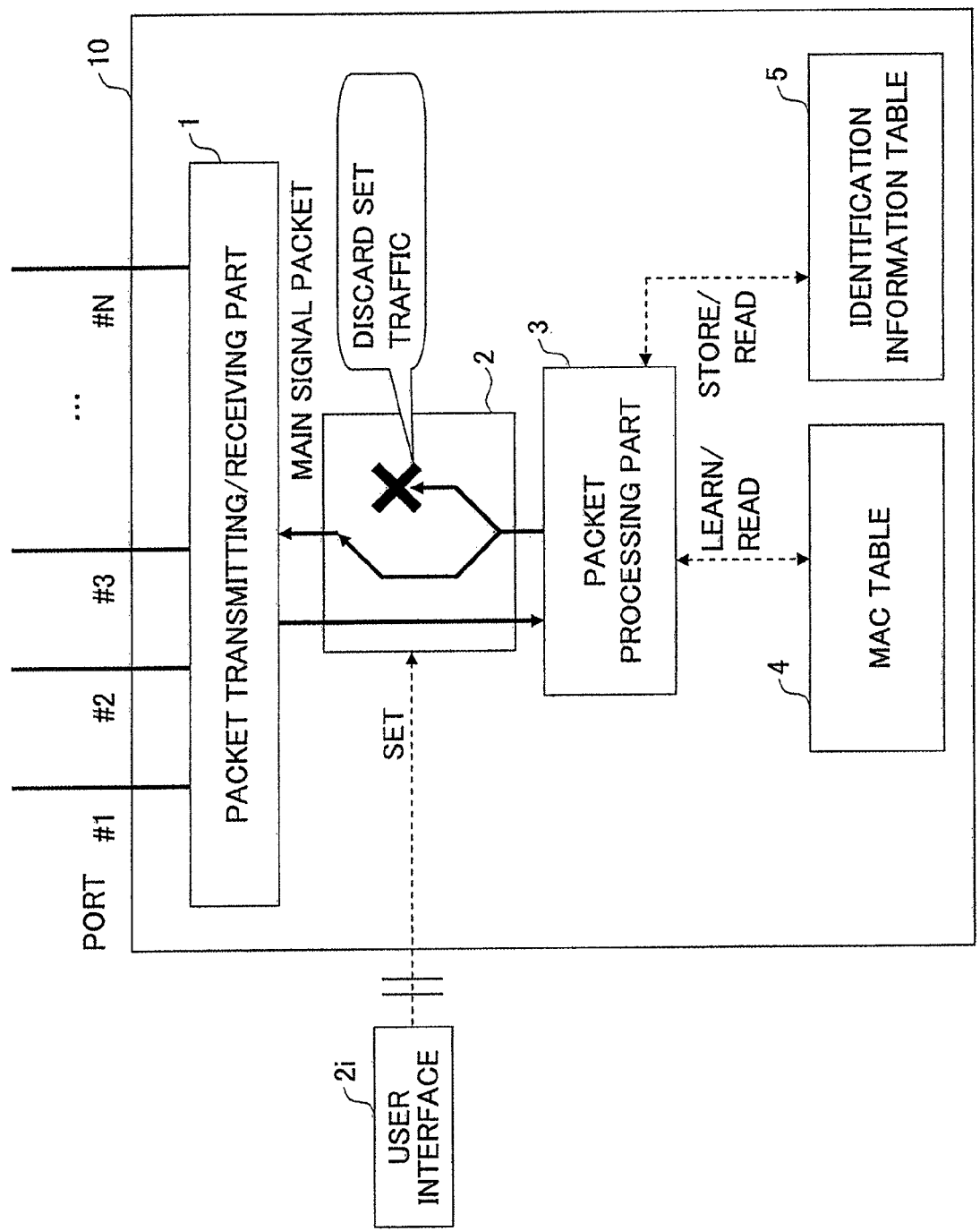
FIGS. 12, 13, 14 and 15 illustrate examples of a function of the filtering/delay processing part depicted in FIG. 8.

Next, another example of a function of the filtering/delay processing part 2 of the communication apparatus 10 will be described with reference to FIG. 12. Specifically, as depicted in FIG. 12, filtering is carried out on a packet which is sent to the packet transmitting/receiving part 1 from the packet processing part 3, i.e., the packet which is sent out from the communication apparatus 10.

More specifically, a packet of a specific traffic which uses a port designated by a user is discarded by the filtering/delay processing part 2, and thus, is prevented from being sent out from the communication apparatus 10.

As a result, a route connected to the designated port is excluded from being processed according to the first-arrival port learning method in an opposite communication apparatus for the designated traffic. As a result, the route connected to the designated port is not learned in the opposite communication apparatus for the designated traffic. Therefore, applying of the route for the designated traffic is intentionally avoided. Thus, artificial routing control is achieved.

It is noted that, in this example, the filtering/delay processing part 2 carries out nothing on a packet which is sent from the packet transmitting/receiving part 1 to the packet processing part 3.

Figure 13:
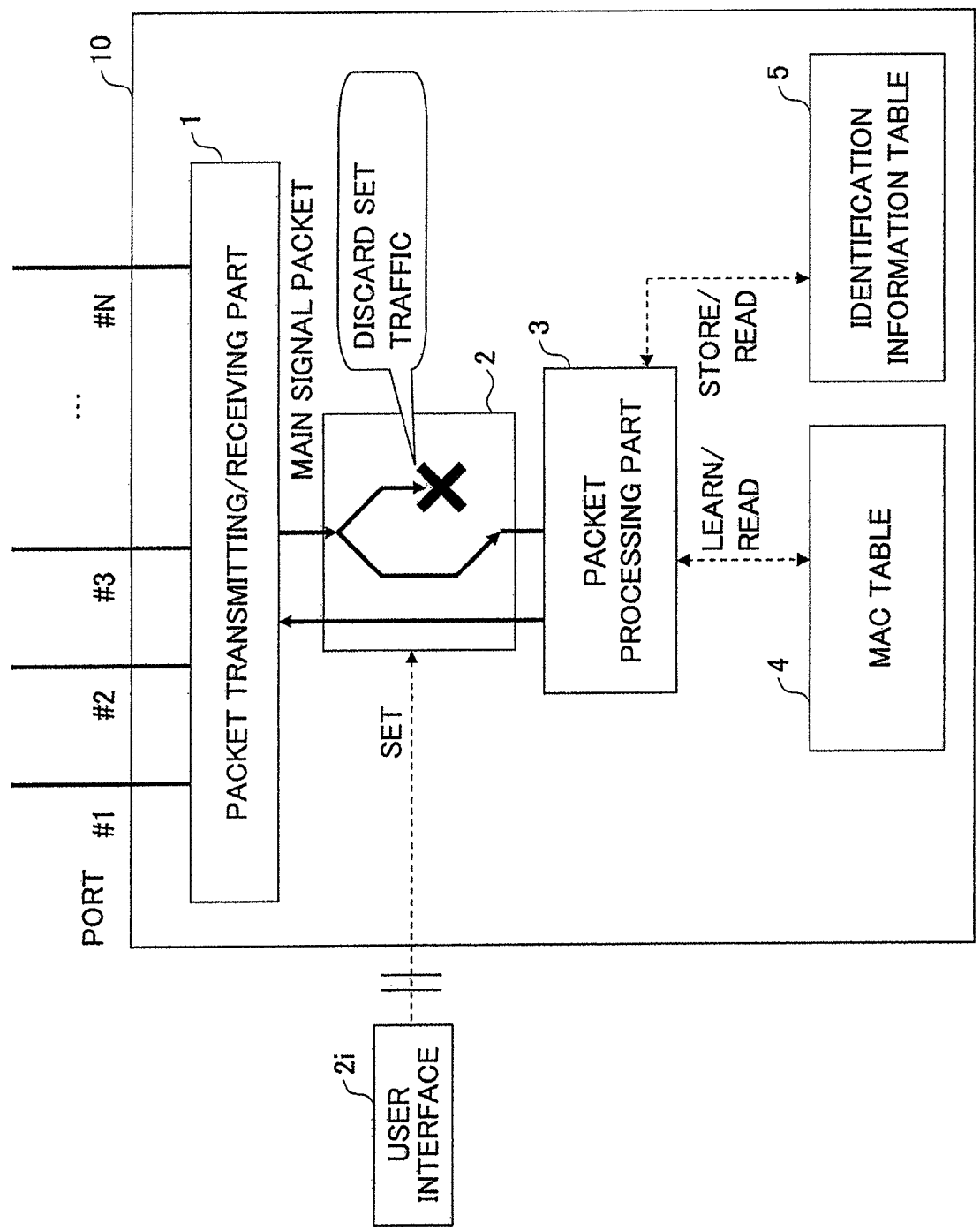

In an example of FIG. 13, the filtering/delay processing part 2 discards a packet which is sent from the packet transmitting/receiving part 1 to the packet processing part 3, i.e., a packet received from the outside of the communication apparatus 10.

More specifically, a packet of a specific traffic which uses a port designated by a user is discarded by the filtering/delay processing part 2, and thus is prevented from being received by the packet processing part 3 of the communication apparatus 10. As a result, a route connected to the designated port is excluded from being processed according to the first-arrival port learning method in the communication apparatus 10 for the designated traffic. As a result, the route connected to the designated port is not learned in the communication apparatus 10 for the designated traffic. Therefore, applying of the route for the designated traffic is intentionally avoided. Thus, artificial routing control is achieved.

It is noted that, in this example, the filtering/delay processing part 2 carries out nothing on a packet which is sent from the packet processing part 3 to the packet transmitting/receiving part 1.

The above-described operation of artificial routing control, i.e., filtering or delay processing, may not be limited to examples in which a user manually sets filtering or a delay time as in the examples of FIGS. 9, 10, 12 and 13.

That is, the communication apparatus 10 can autonomously insert a delay.

As a specific example, the communication apparatus 10 can determine a delay time depending on a transmission rate of a physical port.

An example of the filtering/delay processing part 2 of the communication apparatus 10 in the embodiment of the present invention in this case will now be described with reference to FIG. 14.

Figure 14:
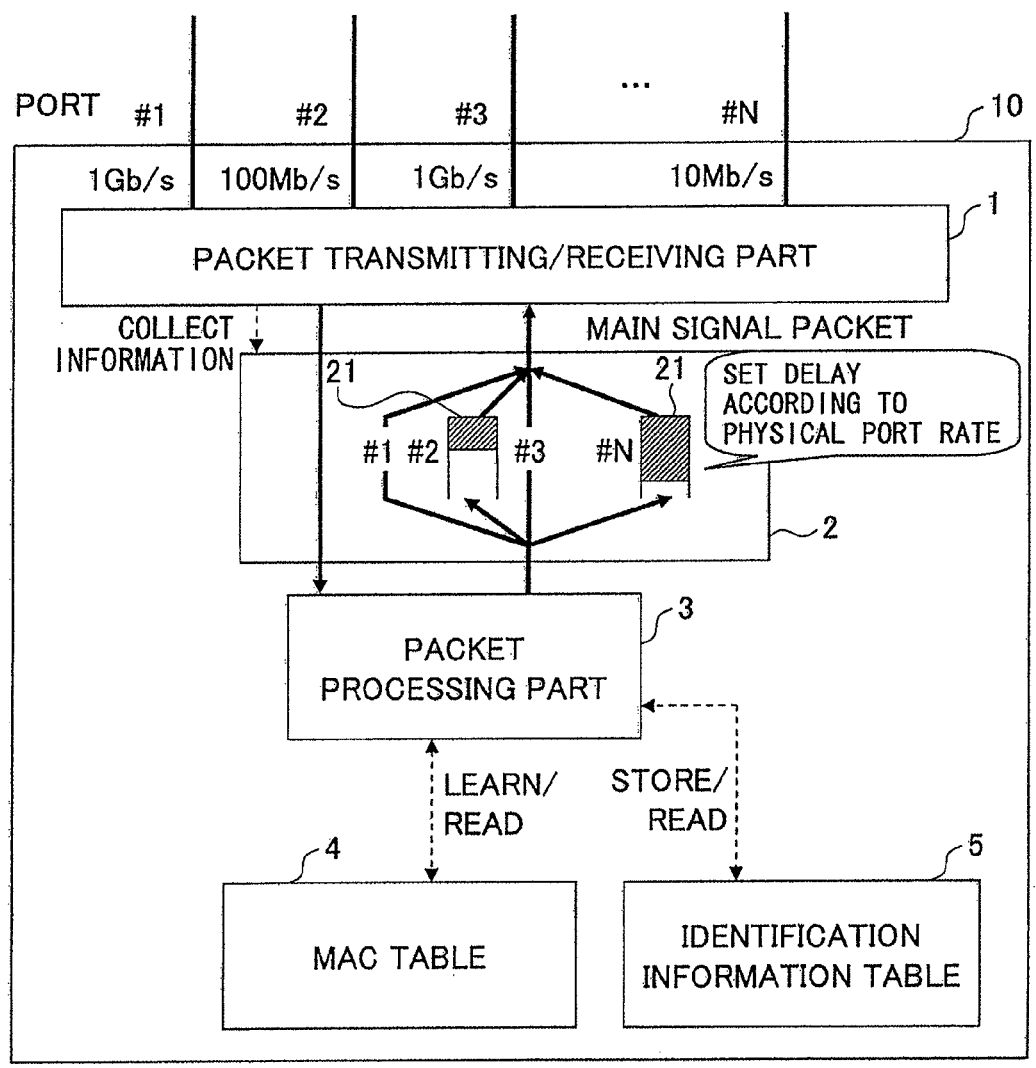

In this example, as depicted in FIG. 14, the filtering/delay processing part 2 collects information of a reception rate of a packet received from each physical port #1, #2, . . . , #N, from the packet transmitting/receiving part 1, automatically determines a delay time depending on the collected information, and inserts the determined delay.

As a specific method of determining a delay time to be inserted, for example, a longer delay time can be inserted for a port having a lower transmission rate. This decreases the likelihood that a port of an opposite communication apparatus connected to the port having the lower transmission rate will become a first-arrival port. Thereby, the likelihood that a corresponding route will be selected as an optimum route in the first-arrival port learning method is reduced. Thus, artificial routing control is achieved.

In an example of FIG. 14, a transmission rate of a port #1 is 1 [Gb/s], a transmission rate of a port #2 is 100 [Mb/s], a transmission rate of a port #3 is 1 [Gb/s], . . . , a transmission rate of a port #N is 10 [Mb/s], as depicted in FIG. 14. Therefore, among these four ports #1, #2, #3, and #N, a delay time inserted for the port #N is longest, and a delay time inserted for the port #1 and the port #3 are shortest. As a result, among the four ports, the likelihood that the port #N having the lowest transmission rate will be adopted for a unicast traffic is reduced, and the likelihood that the ports #1 and #3 each having the highest transmission rate will be adopted for a unicast traffic is increased.

It is noted that FIG. 14 depicts the example using a method of inserting a delay to a packet when the packet is sent out, corresponding to the function of FIG. 9. The configuration of FIG. 14 can be changed to another example using a method of inserting a delay to a packet when the packet is received, corresponding to the function of FIG. 10. Also in this example, a specific method of determining a delay time to be inserted can be the same as above, i.e., a longer delay time can be inserted for a port having a lower transmission rate. Thereby, there is a greater likelihood that the port having the lower transmission rate will not become a first-arrival port.

Another example will now be described in which, instead of a physical port, a delay is automatically determined depending on a transmission rate of a logical port.

A logical port means a virtual port, and a plurality of logical ports can be set for a single physical port. As a specific example, respective VLANs can be set in a Tag VLAN port in a case of an Ethernet interface.

A usage of a Tag VLAN port will now be described. One usage is such that VLAN values identifying VLANs of packets which are allowed to pass through a port are set, and bands are not particularly set. Another usage is such that a logical queue is given to each VLAN, and a reading band is set. In a case of the latter usage, fine logical links exist in one physical link.

Therefore, a configuration such as that of the example described above with reference to FIG. 14 in which a delay time determined depending on a band (i.e., transmission rate) of a physical link (i.e., a physical port) is inserted, can be applied to a logical link (i.e., a logical port). Also in this case, the same as that of the example of FIG. 14, a longer delay time is inserted for a logical band (i.e., a logical port) having a narrower band (i.e., a lower transmission rate).

The above-mentioned reading band means a band for which reading is guaranteed at the very least, or a reading upper limit band.

Figure 15:
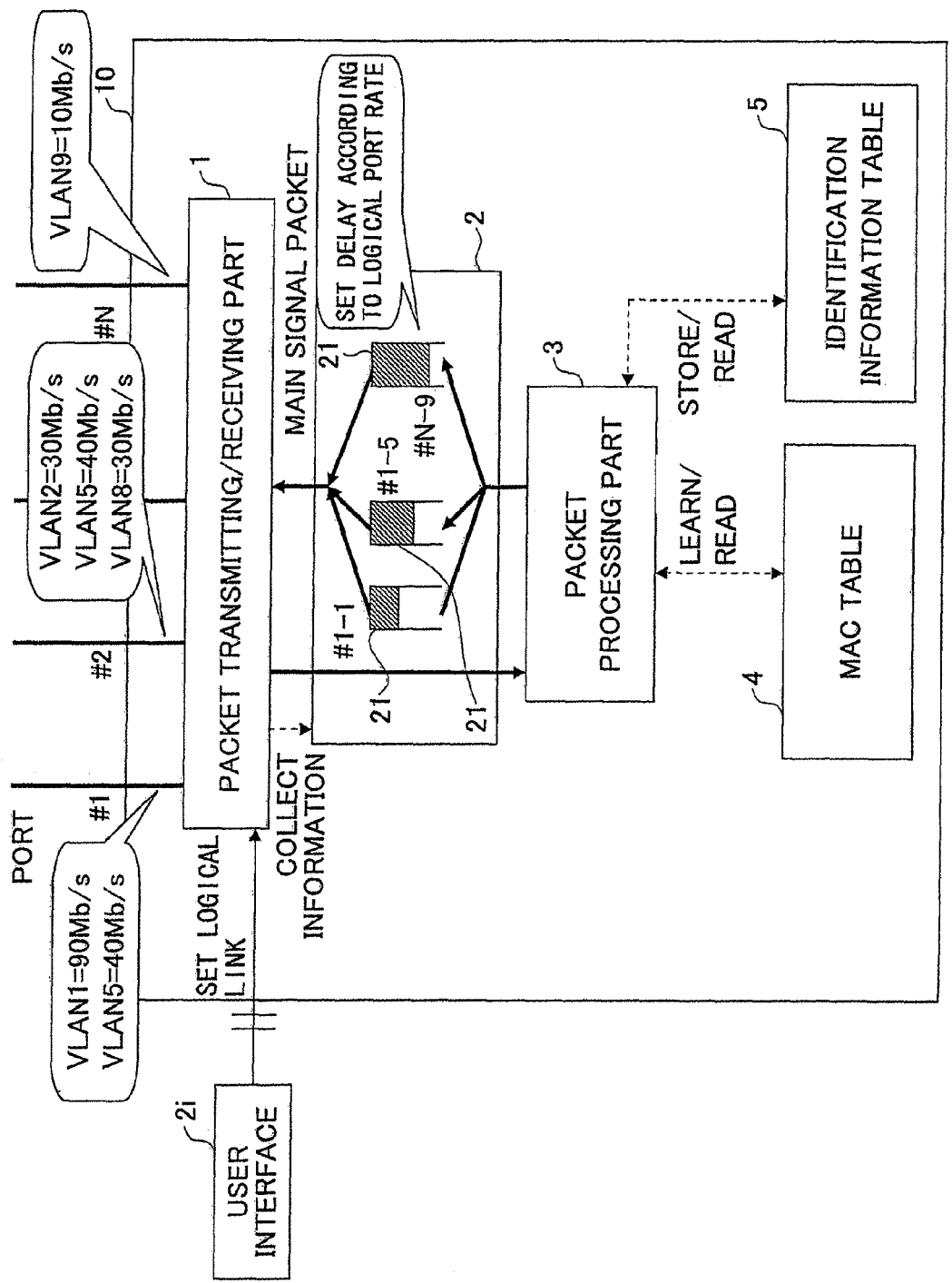

With reference to FIG. 15, the above-mentioned function of inserting a delay depending on a transmission rate of a logical port will now be described.

In an example of FIG. 15, a user sets a band of each logical link to the packet transmitting/receiving part 1. The filtering/delay processing part 2 collects information of a transmission rate of each logical link thus set by the user from the packet transmitting/receiving part 1, and automatically determines a delay time to be inserted.

It is noted that FIG. 15 depicts the example using a method of inserting a delay to a packet when the packet is sent out, corresponding to the function of FIG. 9. The configuration of FIG. 15 can be changed to another example using a method of inserting a delay to a packet when the packet is received, corresponding to the function of FIG. 10. Also in this example, a specific method of determining a delay time to be inserted can be the same as above, i.e., a longer delay time can be inserted for a port having a lower transmission rate. Thereby, there is a greater likelihood that the port having the lower transmission rate will not be adopted for a unicast traffic.

In the example of FIG. 15, as depicted in FIG. 15, a transmission rate of a port #1 is 90 [Mb/s] for VLAN1, and is 40 [Mb/s] for VLAN5, a transmission rate of a port #2 is 30 [Mb/s] for VLAN2, 40 [Mb/s] for VLAN5, and 30 [Mb/s] for VLAN8, and a transmission rate of a port #N is 10 [Mb/s] for VLAN9. Among these five logical ports VLAN1, VLAN2, VLAN5, VLAN8 and VLAN9, a longest delay time is inserted for VLAN9 having the narrowest band, and a shortest delay time is inserted for VLAN1 having the widest band.

Next, with reference to FIGS. 16A, 16B, 16C, 17A, 17B, and 17C, specific examples of operations of the communication apparatus 10 concerning the functions of the filtering/delay processing part 2 in the communication apparatus 10 in the embodiment of the present invention described above with reference to FIGS. 9, 10, 12, 13, 14 and 15 will be described.

Figure 16A:
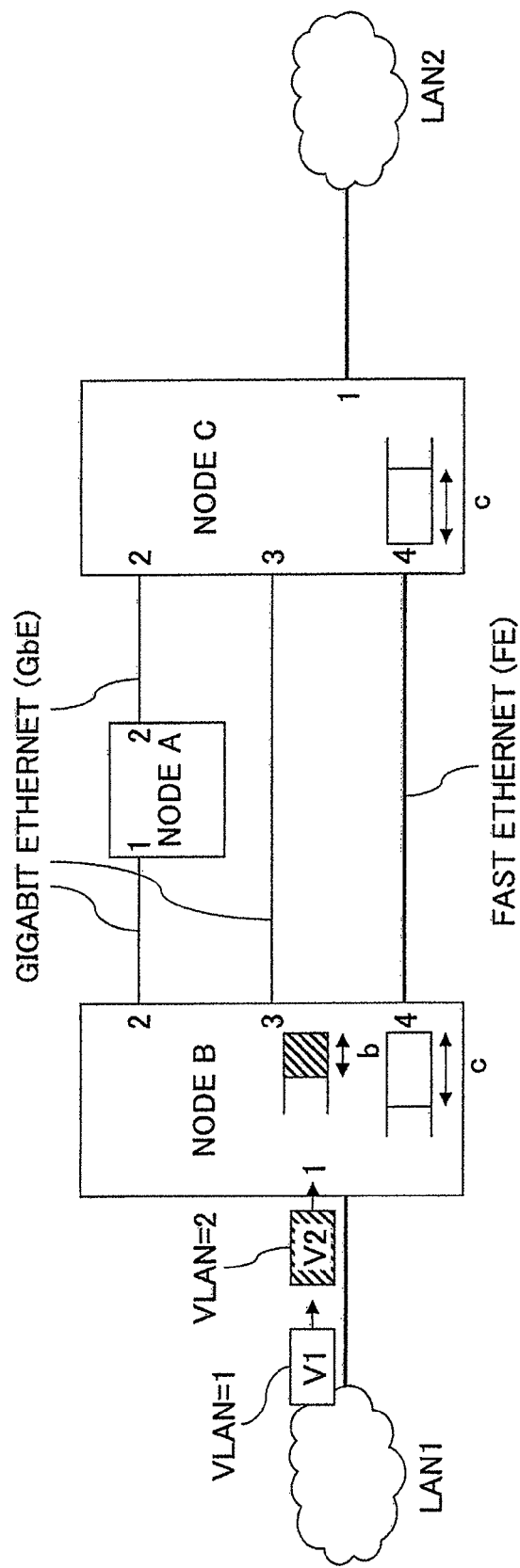
FIGS. 16A, 16B and 16C illustrate specific operation examples of functions depicted in FIGS. 9 and 14 of the communication apparatus depicted in FIG. 8.
Figure 16B:
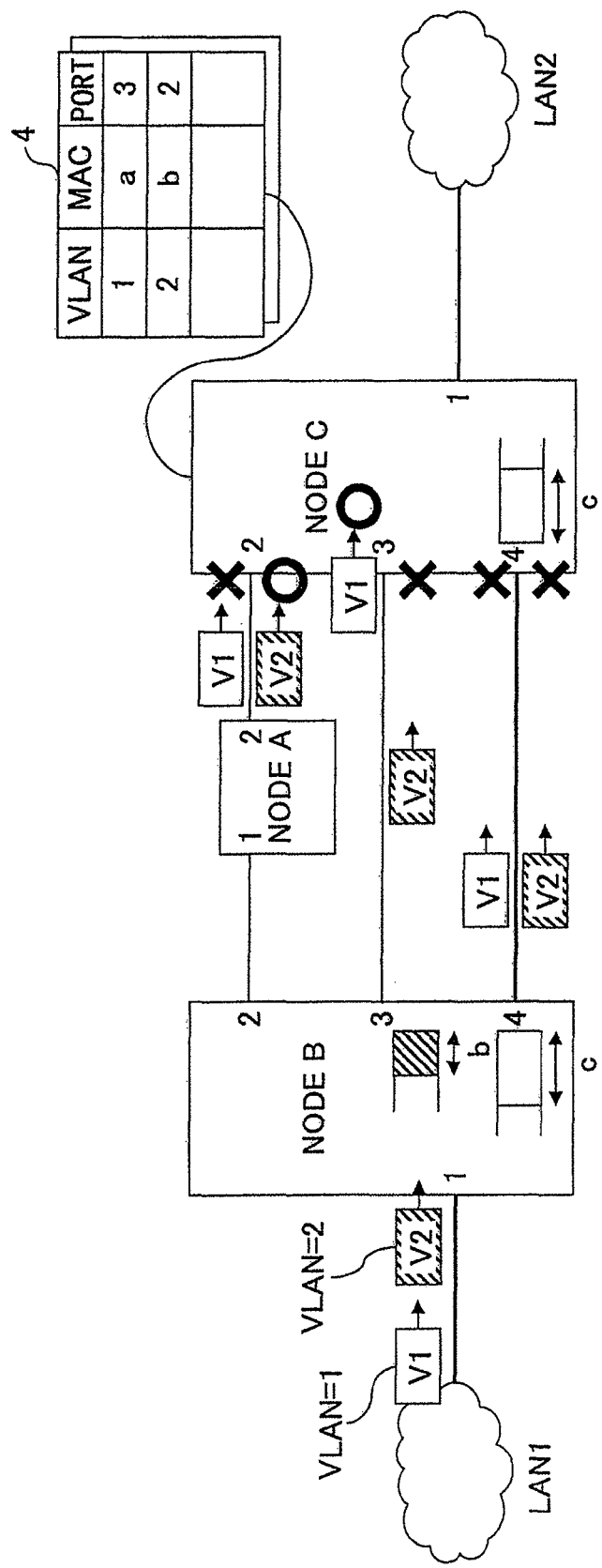
Figure 16C:
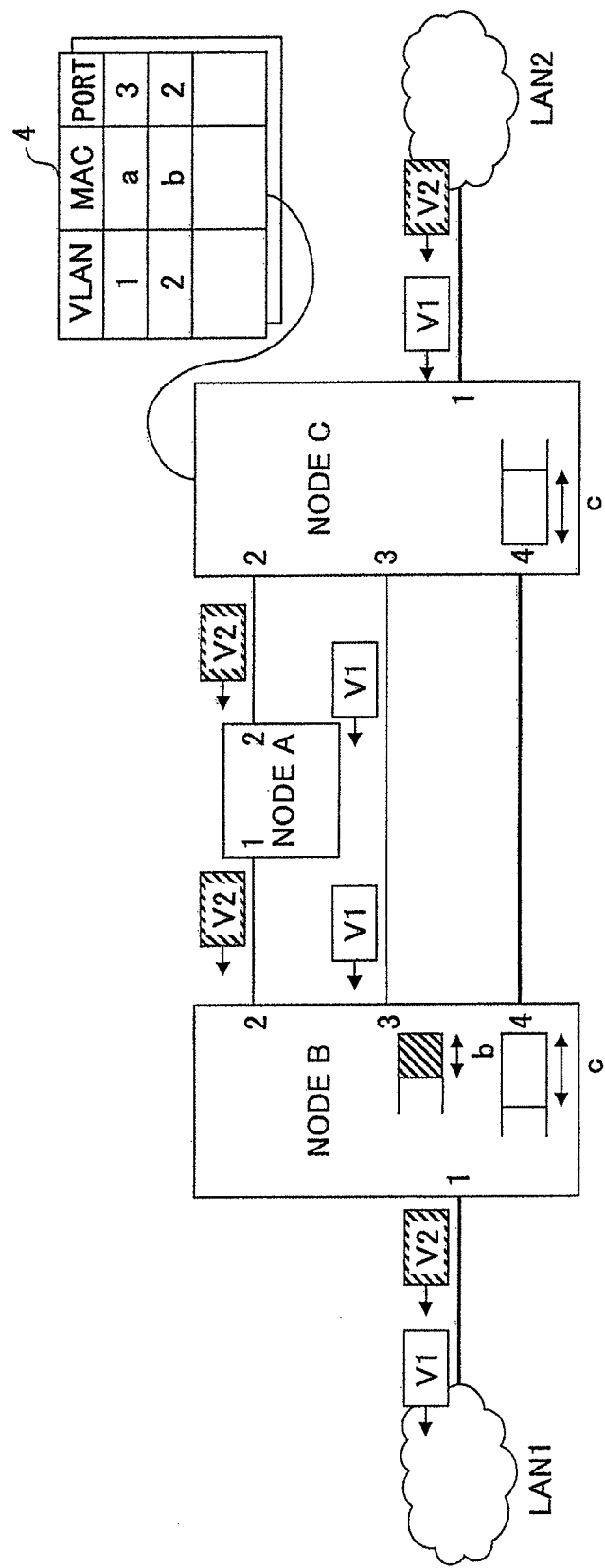

FIGS. 16A, 16B and 16C illustrate a specific example of operation of the example of the function described above with reference to FIGS. 9 and 14.

As depicted in FIGS. 16A, 16B and 16C, three nodes, A, B and C are connected together via a network. The network has the following configuration and settings:

1) Ports 2, 3 and 4 of each of the nodes B and C are Tag VLAN ports, and VLAN=1, 2 are set to each port.

2) A delay "a" (not depicted) is given to a flooding packet when the flooding packet passes through the node A.

3) A delay "b" is given to a traffic of VLAN=2, for the port 3 of the node B.

4) No delay is automatically given to routes of GbE connected to the ports 2 and 3, while a delay "c" is automatically given to a route of FE connected to the port 4.

The above-mentioned delay times "a", "b" and "c" have the following relationship: $a \leq b \leq c$. According to the above-described condition, as depicted in FIG. 16A, the delay "b" is set to VLAN 2 for the port 3 and the delay "c" is set for the port 4 of the node B, and the delay "c" is set for the port 4 of the node C.

In the network, it is assumed that, from LAN1 to LAN2, not yet learned packets of VLAN=1 and VLAN=2 are sent.

As a result, as depicted in FIG. 16B, since the packets are not yet learned packets as mentioned above, the packets are made to flood from the node B to the entire broadcast domain other than the arrival port.

First, as to the packet of VLAN=1, the packet that arrives at the node C from the port 2 is given the delay time "a" by the node A according to the above-mentioned setting 2). Therefore, the packet arrives at the node C after a delay time which is a sum of a transmission delay and the delay "a".

On the other hand, the packet of VLAN=1 that arrives at the node C from the port 3 is not given any delay time by the node B. This is because, according to the above-mentioned setting 3), the delay "b" is given to the port 3 for a traffic of VLAN=2 but no delay is given to the port 3 for a traffic of VLAN=1. As a result, the packet arrives at the node C with a delay time of only a transmission delay.

Each packet arrives at the node C from the port 4 with a delay time of a sum of a transmission delay and the delay "c". This is because, according to the above-mentioned setting 4), the delay "c" is given uniformly to a packet passing through a route of the port 4.

In summary, the delays occurring in arrival times at the node C for the respective routes are as follows: a transmission delay and a delay "a" for the port 2, only a transmission delay for the port 3, and a transmission delay and a delay "c" for the port 4. Assuming that the transmission delays are uniform among the respective three routes of the ports 2, 3 and 4, the port 3 has the smallest delay of "only a transmission delay". Therefore, in the example, for a packet of VLAN=1, the port 3 is learned as a first-arrival port in the node C (i.e., VLAN, MAC and PORT are 1, "a" and 3, respectively, as depicted in a first record of a MAC table 4 of FIG. 16B).

On the other hand, for a packet of VLAN=2, the same delays occur for the ports 2 and 4 as those for a packet of VLAN=1. However, a packet that arrives from the port 3 has a delay time of a sum of a transmission delay and a delay "b".

Therefore, for VLAN=2, the port 2 has a delay of a transmission delay and a delay "a", the port 3 has a delay of a transmission delay and a delay "b", and the port 4 has a delay of a transmission delay and a delay "c". Assuming that the transmission delays are uniform among the three routes of the ports 2, 3 and 4, the port 2 has the shortest delay because of the above-mentioned relationship of a>b>c. Therefore, in the example, for a packet of VLAN=2, the port 2 is learned as a first-arrival port in the node C (i.e., VLAN, MAC and PORT are 2, "b" and 2, respectively, as depicted in a second record of the MAC table 4 of FIG. 16B).

Thus, in the example of FIGS. 16A, 16B and 16C, for a packet of VLAN=1, the route of the port 3 is determined as an optimum route, and for a packet of VLAN=2, the route of the port 2 is determined as an optimum route. As a result, for a unicast traffic from LAN1 to LAN2, as depicted in FIG. 16C, routing control is carried out such that a packet of VLAN=1 is made to pass through the route of the port 3, and a packet of VLAN=2 is made to pass through the route of the port 2. Thus, traffics of VLAN=1 and 2 pass through different routes, respectively, and effective load distribution is achieved.

In the example of FIGS. 16A, 16B and 16C, for the port 4 of a route having a narrow band (i.e., of FE), the delay is automatically inserted, and thus, the port 4 is made to not become a first-arrival port. Accordingly, there is a greater likelihood that the route of the port 4 will not be adopted for a unicast traffic. Also in this view point, effective load distribution is achieved.

Next, with reference to FIGS. 17A, 17B and 17C, a specific example of operation of the example of the function of the filtering/delay processing part 2 of the communication apparatus 10 in the embodiment described above with reference to FIGS. 10 and 15 will be described.

In this case, as depicted in FIG. 17A, a network connecting between nodes B and C is assumed. In the network the following settings are made:

1) All the links between the nodes B and C are of GbE, and transmission delays are uniform among nodes 2, 3 and 4.

2) Each of the ports 2, 3 and 4 of the nodes B and C are Tag VLAN ports, and, for each of the ports 2, 3 and 4, VLAN=1, 2, 3 are set.

3) For each of the ports 2, 3 and 4 between the nodes B and C, logical links are provided, and the following upper limit bands are set (set bands are symmetrical):

Port 2: VLAN1=100 [Mb/s],

VLAN2=500 [Mb/s],

VLAN3=800[Mb/s],

Port 3: VLAN1=400 [Mb/s],

VLAN2=300 [Mb/s],

VLAN3=200 [Mb/s],

Port 4: VLAN1=200 [Mb/s],

VLAN2=400 [Mb/s],

VLAN3=100 [Mb/s]

For these logical ports, a delay time of 1 [ms]×1000 [Mb/s]/(logical band) is automatically given.

For VLAN2 of the ports 2 of the nodes B and C, an operator artificially sets a delay time of 5 [ms].

According to the above-described configuration and settings of the network, delay times are set for respective logical ports as depicted in FIG. 17B.

Automatically set delay times and artificially set delay times for the respective logical ports are as follows:

Port 2: VLAN1=10 [ms],

VLAN2=2 [ms]+5 [ms],

VLAN3=1.25 [ms]

Port 3: VLAN1=2.5 [ms],

VLAN2=3.33 [ms],

VLAN3=5 [ms]

Port 4: VLAN1=5 [ms],

VLAN2=2.5 [ms],

VLAN3=10 [ms]

The respective ones of the automatically set delay times are obtained from the following formulas, where, as mentioned above, 1 [ms]×1000 [Mb/s]/(logical band) is automatically given.

For the port 2,

VLAN1=100 [Mb/s], and therefore,

1000/100=10 [ms],

VLAN2=500 [Mbs], and therefore,

1000/500=2[ms],

VLAN3=800 [Mb/s], and therefore,

1000/800=1.25 [ms]

For the port 3,

VLAN1=400 [Mb/s], and therefore,

1000/400=2.5 [ms],

VLAN2=300 [Mb/s], and therefore,

1000/300=3.33 [ms],

VLAN3=200 [Mb/s], and therefore,

1000/200=5 [ms],

For the port 4,

VLAN1=200 [Mb/s], and therefore,

1000/200=5 [ms],

VLAN2=400 [Mb/s], and therefore,

1000/400=2.5 [ms],

VLAN3=100 [Mb/s], and therefore,

1000/100=10 [ms]

As in the example of operation, it is possible to add a delay artificially further to an automatically set delay. Thus, in a case where load distribution is not sufficiently achieved by means of only automatically set delay times, a further delay time can be added artificially to achieve load distribution sufficiently.

In the example of operation, by means of only the automatically set delay times, there is a greater likelihood that the port 2 will become a first-arrival port for VLAN2, and further, that the port 2 will become a first-arrival port also for VLAN3. Therefore, the operator inserts the delay of 5 [ms] to the port 2 for VLAN2 intentionally for the purpose of decreasing the likelihood that the port 2 will be selected for VLAN2.

Figure 17C:
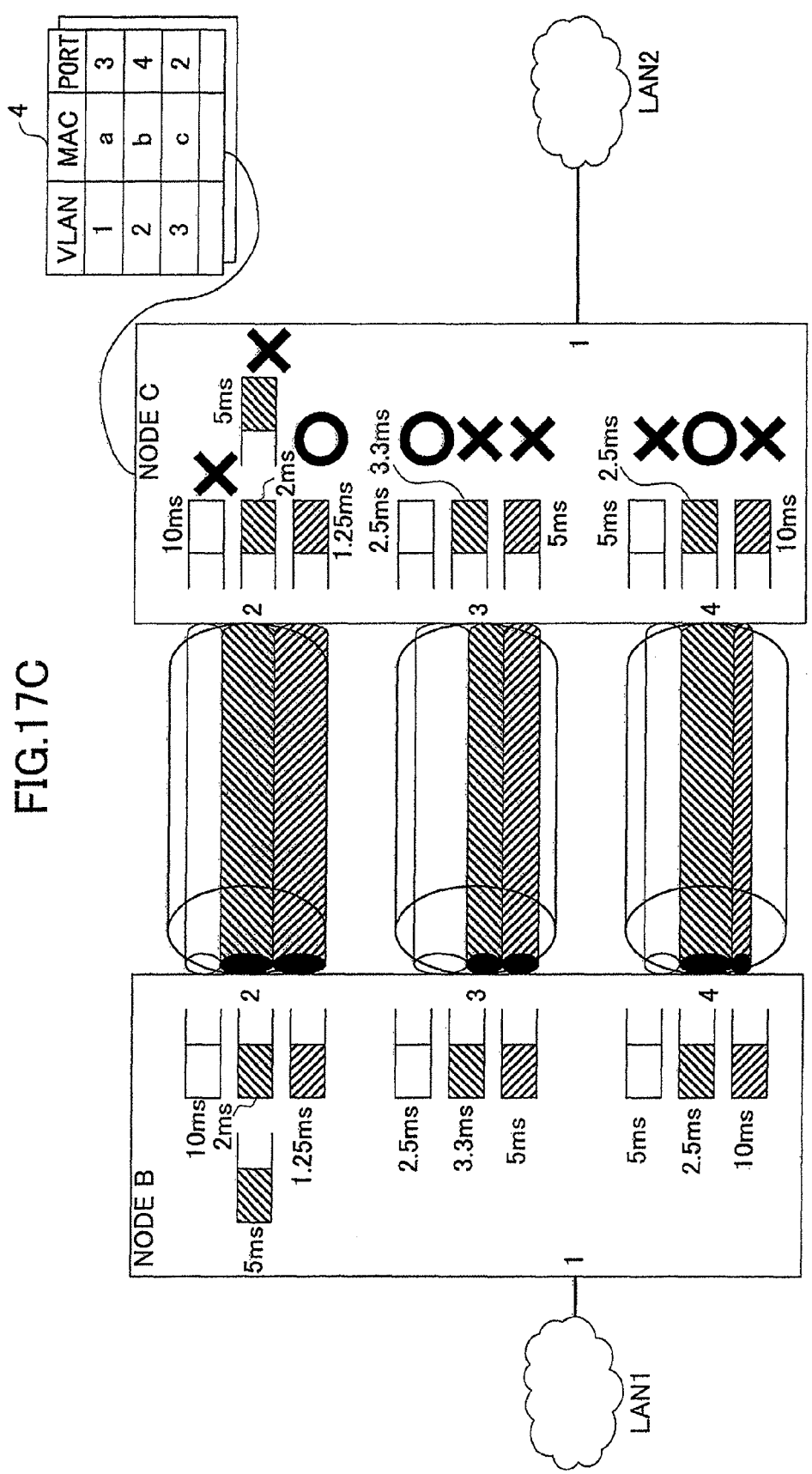

In the network of FIGS. 17A, 17B and 17C, a case is assumed that not yet learned packets of VLAN=1, 2, 3 are sent from LAN1 to LAN2, as depicted in FIG. 17C.

These packets are not yet learned packets, and thus, are made to flood from the node B to the entire broadcast domain other than the arrival port.

First, for VLAN=1, packets arrive at the node C from the port 2 with a delay of 10 [ms], from the port 3 with a delay of 2.5 [ms], and from the port 4 with a delay of 5 [ms]. Therefore, the delay of 2.5 [ms] for packets that arrive from the port 3 is the shortest delay, the packets from the port 3 arrive first accordingly, and thus, the port 3 is learned as a first-arrival port.

For VLAN=2, packets arrive at the node C from the port 2 with a delay of 2+5=7 [ms], from the port 3 with a delay of 3.33 [ms], and from the port 4 with a delay of 2.5 [ms]. Therefore, the delay of 2.5 [ms] for packets that arrive from the port 4 is the shortest delay, the packets from the port 4 arrive first accordingly, and thus, the port 4 is learned as a first-arrival port.

For VLAN=3, packets arrive at the node C from the port 2 with a delay of 1.25 [ms], from the port 3 with a delay of 5 [ms], and from the port 4 with a delay of 10 [ms]. Therefore, the delay of 1.25 [ms] for packets that arrive from the port 2 is the shortest delay, the packets from the port 2 arrive first accordingly, and thus, the port 2 is learned as a first-arrival port normally.

In summary, in the node C, for VLAN=1, 2, 3, the ports 3, 4, 2 are learned as first-arrival ports, respectively.

The ports thus learned as the first-arrival ports are used for unicast traffics from LAN2 to LAN1. Thus, for VLAN=1, 2, 3, respective traffics pass through different routes, and effective load distribution is achieved.

As described above, in the embodiment of the present invention, the first-arrival port learning method is used. According to the first-arrival port learning method, in a packet network, a node which receives a main signal packet floods the packet as a plurality of packets without adding information to the packets to a broadcast domain except for a node from which the main signal packet has been received. According to the first-arrival port learning method, each node receiving a flooding packet then learns a port (first-arrival port) from which the packet has arrived first, as well as a transmission source identifier in a forwarding table (i.e., the address table or the MAC table). In the embodiment of the present invention, each node carries out inserting a delay or filtering processing on a specific traffic to be transmitted or received from a designated port, and thus a route to be selected according to the first-arrival learning method can be controlled (see FIG. 8).

As a result, it is possible to artificially control routing, and to achieve traffic load distribution without losing characteristics of the first-arrival port learning method in which a control plane is not used.

Further, as the above-mentioned inserting a delay or filtering processing, a delay can be inserted when a flooding packet is sent out (see FIG. 9).

As a result, by means of processing in a transmission-side node, there is a greater likelihood that, in a receiving-side node, a specific port will not be selected for a specific traffic.

By means of the method of inserting a delay, different from filtering (i.e., discarding a flooding packet), a flooding packet arrives at an opposite node with a delay. As a result, even if another flooding packet does not arrive at an opposite node because of a trouble in another route, a port of a route for which a delay is inserted can be selected as a first-arrival port. Therefore, it is possible to achieve a function equivalent to high cost setting of a protocol in the related art.

Further, in the method of inserting a delay, a delay can be inserted when a packet is received (see FIG. 10).

As a result, there is a greater likelihood that, in a reception-side node, a specific port will now be selected for a specific traffic. Also in this case, it is possible to achieve a function equivalent to high cost setting of a protocol in the related art.

Instead of inserting a delay, a packet can be discarded (i.e., filtering) and thus a packet is not transmitted in a flooding manner (see FIG. 12).

Thereby, as a result of processing in a transmission-side node, it is possible that, in a reception-side node, a specific port is never selected for a specific traffic.

This method of filtering results in completely preventing a designated port from becoming a candidate for a first-arrival port, and thus, even if another flooding packet does not arrive an opposite node because of a trouble occurring in another route for example, the designated port is never selected. In this method, processing such as tuning of a delay time required for the above-mentioned method of inserting a delay is not required. Thus, it is possible to achieve artificial routing control with a simpler configuration.

Further, instead of discarding a packet which will be otherwise sent out, a packet which is received can be discarded (see FIG. 13).

As a result, it is possible that, in a reception-side node, a designated port is never selected for a specific traffic. Also in this case, the same as in the above case, it is possible to achieve artificial routing control with a simpler configuration.

Further, a delay time to be inserted can be automatically determined depending on a physical transmission rate of each port (see FIG. 14).

In this case, there is a greater likelihood that a physical link having a narrow band will not be selected, automatically. As a result, more efficient load distribution is achieved.

Further, a delay time to be inserted can be automatically determined depending on a logical transmission rate of each port (see FIG. 15).

In this case, a concept of automatically determining a delay time depending on a physical transmission rate of a port is applied to a logical port, and there is a greater likelihood that a logical link having a narrow band will not be selected, automatically. As a result, more efficient load distribution is achievable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that various changes, substitutions, and alterations could be made hereto without departing from the spirit and scope of the invention.

What is claimed is:

1. A routing control method comprising:
  learning a route of receiving a first packet at a communication apparatus, which first packet has identification information attached thereto, only for the first packet having first arrived among a plurality of first packets that have identification information common to that of the first packet, which route is applied for transmitting a second packet having the same identification information as that of the first packet; and
  controlling a transmission of the first packet depending on a condition of the first packet when the first packet has been received or is to be transmitted from a specific port of the communication apparatus.

2. The routing control method as claimed in claim 1, wherein:
  said controlling the transmission of the first packet includes controlling timing of the transmission of the first packet.

3. The routing control method as claimed in claim 1, wherein:
  said controlling the transmission of the first packet includes determining whether to transmit the first packet, or to discard the first packet without transmitting the first packet.

4. The routing control method as claimed in claim 1, wherein:
  the condition of the first packet includes a transmission rate of the first packet.

5. The routing control method as claimed in claim 4, wherein:
  the transmission rate of the first packet is a physical transmission rate of the first packet.

6. The routing control method as claimed in claim 4, wherein:
  the transmission rate of the first packet is a logical transmission rate of the first packet.

7. The routing control method as claimed in claim 2, wherein:
  said controlling the timing of the transmission of the first packet includes giving a delay to the transmission of the first packet, wherein the delay of the transmission of the first packet becomes smaller as the first packet is given a wider band for the transmission of the first packet.

8. The routing control method as claimed in claim 1, wherein:
  a manner of said controlling the transmission of the first packet is automatically determined depending on the condition of the first packet.

9. The routing control method as claimed in claim 1, wherein:
  a manner of said controlling the transmission of the first packet is set by an operator.

10. A communication apparatus comprising:
  a learning part configured to learn a route of receiving a first packet, which first packet has identification information attached thereto, only for the first packet having first arrived among a plurality of first packets that have identification information common to that of the first packet, which route is applied for transmitting a second packet having the same identification information as that of the first packet; and
  a transmission controlling part configured to control a transmission of the first packet depending on a condition of the first packet when the first packet has been received or is to be transmitted from a specific port of the communication apparatus.

11. The communication apparatus as claimed in claim 10, wherein:
  the transmission controlling part is configured to control timing of the transmission of the first packet.

12. The communication apparatus as claimed in claim 10, wherein:
the transmission controlling part is configured to determine whether to transmit the first packet, or to discard the first packet without transmitting the first packet.

13. The communication apparatus as claimed in claim 10, wherein:
the condition of the first packet includes a transmission rate of the first packet.

14. The communication apparatus as claimed in claim 13, wherein:
the transmission rate of the first packet is a physical transmission rate of the first packet.

15. The communication apparatus as claimed in claim 13, wherein:
the transmission rate of the first packet is a logical transmission rate of the first packet.

16. The communication apparatus as claimed in claim 11, wherein:
the transmission controlling part is configured to give a delay to the transmission of the first packet, wherein the delay of the transmission of the first packet becomes smaller as the first packet is given a wider band for the transmission of the first packet.

17. A communication system comprising a plurality of communication nodes mutually connected via a communication network, each of the plurality of communication nodes comprising:
a learning part configured to learn a route of receiving a first packet, which first packet has the identification information attached thereto, only for the first packet among a plurality of first packets that have identification information common to that of the first packet, which route is applied for transmitting a second packet having the same identification information as that of the first packet; and
a transmission controlling part configured to control a transmission of the first packet depending on a condition of the first packet when the first packet has been received or is to be transmitted from a specific port of the communication node.

18. The communication system as claimed in claim 17, wherein:
the transmission controlling part is configured to control timing of the transmission of the first packet.

19. The communication system as claimed in claim 17, wherein:
the transmission controlling part is configured to determine whether to transmit the first packet, or to discard the first packet without transmitting the first packet.

20. The communication system as claimed in claim 18, wherein:
the transmission controlling part is configured to give a delay to the transmission of the first packet, wherein the delay of the transmission of the first packet becomes smaller as the first packet is given a wider band for the transmission of the first packet.

* * * * *